United States Patent
Björkman et al.

(10) Patent No.: US 12,262,069 B2
(45) Date of Patent: Mar. 25, 2025

(54) SYSTEM AND METHOD FOR PRODUCING A VIDEO STREAM

(71) Applicant: LIVEARENA TECHNOLOGIES AB, Stockholm (SE)

(72) Inventors: Andreas Björkman, Täby (SE); Anders Nilsson, Falköping (SE); Lars Erlman, Leksand (SE); Per Blankens, Enebyberg (SE); Maxx Sörqvist, Bålsta (SE); Marcus Ragnarsson, Gothenburg (SE)

(73) Assignee: LiveArena Technologies AB, Stockholm (SE)

( * ) Notice: Subject to any disclaimer, the term of this patent is extended or adjusted under 35 U.S.C. 154(b) by 0 days.

(21) Appl. No.: 18/434,868

(22) Filed: Feb. 7, 2024

(65) Prior Publication Data
US 2024/0179357 A1    May 30, 2024

Related U.S. Application Data

(63) Continuation of application No. PCT/SE2023/050090, filed on Feb. 3, 2023.

(30) Foreign Application Priority Data
Feb. 4, 2022    (SE) .................................. 2250113-4

(51) Int. Cl.
*H04N 21/234*    (2011.01)
*G06F 3/01*    (2006.01)
(Continued)

(52) U.S. Cl.
CPC ....... *H04N 21/23424* (2013.01); *G06F 3/013* (2013.01); *G06F 3/017* (2013.01);
(Continued)

(58) Field of Classification Search
CPC .......... H04N 19/142; H04N 21/23424; H04N 21/4307; H04N 21/44218
(Continued)

(56) References Cited

U.S. PATENT DOCUMENTS 8,830,295 B2    9/2014    Vivekanandan et al.
8,830,296 B1    9/2014    Vivekanandan et al.
(Continued)

FOREIGN PATENT DOCUMENTS

EP    3908006 A2    11/2021
WO    03096669 A2    11/2003

OTHER PUBLICATIONS

International preliminary report on patentability issued by the Swedish Intellectual Property Office on Dec. 14, 2023.
(Continued)

*Primary Examiner* — Dominic D Saltarelli
(74) *Attorney, Agent, or Firm* — Noréns Patentbyrå AB

(57) ABSTRACT

Methods, systems, and computer program products for providing a shared digital video stream. A first and a second digital video stream are collected. The shared stream is produced based on the first stream so that the first source is visible in the shared stream, but so that the second source is not visible in the shared stream. The first and/or second stream are analysed to detect a trigger, based on detection of a predetermined image and/or audio pattern, the trigger being a detected gazing or a gesture. The shared stream based on the second stream and/or based on the first source but with at least one of a different cropping, a different zooming, a different panning, or a different focus plane selection. The output stream is provided to a consumer.

12 Claims, 8 Drawing Sheets

(51) Int. Cl.
  *G06T 3/40*    (2006.01)
  *H04N 7/14*    (2006.01)
  *H04N 7/15*    (2006.01)
  *H04N 21/43*   (2011.01)
  *H04N 21/442*  (2011.01)

(52) U.S. Cl.
  CPC .............. *G06T 3/40* (2013.01); *H04N 7/147* (2013.01); *H04N 7/152* (2013.01); *H04N 21/4307* (2013.01); *H04N 21/44218* (2013.01)

(58) Field of Classification Search
  USPC ........................................................ 375/240
  See application file for complete search history.

(56) References Cited

U.S. PATENT DOCUMENTS

| | | |
|---|---|---|
| 8,908,005 B1 | 12/2014 | Leske et al. |
| 9,438,937 B1 | 9/2016 | Buchheit |
| 9,998,769 B1 | 6/2018 | Fernandes |
| 10,135,601 B1 | 11/2018 | Beardsley et al. |
| 10,348,794 B2 | 7/2019 | Hundemer |
| 11,082,467 B1 | 8/2021 | Hartnett et al. |
| 11,277,620 B1 | 3/2022 | Liu et al. |
| 11,374,988 B1 | 6/2022 | Lanier |
| 11,622,147 B2 | 4/2023 | Pranger et al. |
| 11,882,345 B2 | 1/2024 | Packard et al. |
| 2006/0251382 A1 | 11/2006 | Vronay et al. |
| 2008/0297587 A1 | 12/2008 | Kurtz et al. |
| 2010/0104005 A1 | 4/2010 | Amsterdam et al. |
| 2010/0220172 A1 | 9/2010 | Michaelis |
| 2010/0238262 A1 | 9/2010 | Kurtz et al. |
| 2012/0127262 A1 | 5/2012 | Wu et al. |
| 2012/0236160 A1 | 9/2012 | Rezek et al. |
| 2013/0135427 A1 | 5/2013 | Wu et al. |
| 2013/0179911 A1 | 7/2013 | Dang et al. |
| 2013/0216206 A1 | 8/2013 | Dubin et al. |
| 2014/0168354 A1 | 6/2014 | Clavel et al. |
| 2015/0215582 A1 | 7/2015 | Leske et al. |
| 2015/0281586 A1 | 10/2015 | Mate et al. |
| 2016/0006990 A1 | 1/2016 | Williamsson et al. |
| 2016/0066064 A1 | 3/2016 | Chesluk et al. |
| 2016/0148649 A1 | 5/2016 | Rehn et al. |
| 2016/0286244 A1 | 9/2016 | Chang et al. |
| 2016/0359941 A1 | 12/2016 | Kvaal et al. |
| 2017/0208292 A1 | 7/2017 | Smits |
| 2017/0318261 A1 | 11/2017 | Dalvi et al. |
| 2018/0077437 A1 | 3/2018 | Hansen et al. |
| 2018/0098100 A1 | 4/2018 | Turner |
| 2018/0213288 A1 | 7/2018 | Patry et al. |
| 2019/0058927 A1 | 2/2019 | Lu et al. |
| 2019/0132371 A1 | 5/2019 | Bhat et al. |
| 2019/0166057 A1 | 5/2019 | Gilson |
| 2019/0191226 A1 | 6/2019 | Ni et al. |
| 2019/0215464 A1 | 7/2019 | Kumar et al. |
| 2020/0104601 A1 | 4/2020 | Karoui et al. |
| 2020/0267427 A1* | 8/2020 | Rogers .................. H04N 21/84 |
| 2021/0203519 A1 | 7/2021 | Sharma |
| 2021/0271890 A1 | 9/2021 | Tsuchiya |
| 2021/0352359 A1 | 11/2021 | Barvo et al. |
| 2021/0377631 A1 | 12/2021 | Viswanathan |
| 2022/0150083 A1 | 5/2022 | Faulkner |
| 2022/0174357 A1* | 6/2022 | Zavesky .......... H04N 21/44213 |
| 2022/0400300 A1 | 12/2022 | Blythe et al. |
| 2023/0133265 A1 | 5/2023 | Springer |
| 2024/0179357 A1 | 5/2024 | Björkman et al. |
| 2024/0267488 A1 | 8/2024 | Björkman et al. |

OTHER PUBLICATIONS

Second written opinion issued by the IPEA/SE on Dec. 15, 2023.
International preliminary report on patentability issued by IPEA/SE on Feb. 21, 2024.

* cited by examiner

SYSTEM AND METHOD FOR PRODUCING A VIDEO STREAM

FIELD OF THE INVENTION

The various embodiments of the present invention relate to digital video and in particular to producing a digital video stream based on two or more different digital input video streams.

BACKGROUND

There are many known digital video conference systems, such as Microsoft® Teams®, Zoom® and Google® Meet®, offering two or more participants to meet virtually using digital video and audio recorded locally and broadcast to all participants to emulate a physical meeting.

There is a general need to improve such digital video conference solutions, in particular with respect to the production of viewed content, such as what is shown to whom at what time, and via what distribution channels.

For instance, some systems automatically detect a currently talking participant, and show the corresponding video feed of the talking participant to the other participants. In many systems it is possible to share graphics, such as the currently displayed screen, a viewing window, or a digital presentation. As virtual meetings become more complex, however, it quickly becomes more difficult for the service to know what of all currently available information to show to each participant at each point in time.

In other examples a presenting participant moves around on a stage while talking about slides in a digital presentation. The system then needs to decide whether to show the presentation, the presenter or both, or to switch between the two.

It may be desirable to produce one or several output digital video streams based on a number of input digital video streams by an automatic production process, and to provide such produced digital video stream or streams to one or several consuming entities.

However, in many cases it is difficult for a dynamic conference screen layout manager or other automated production function to select what information to show, due to a number of technical difficulties facing such digital video conference systems.

Firstly, since a digital video meeting has a real-time aspect, it is important that latency is low. This poses problems when different incoming digital video streams, such as from different participants joining using different hardware, are associated with different latencies, frame rates, aspect ratios or resolutions. Many times, such incoming digital video streams need processing for a well-formed user experience.

Secondly, there is a problem with time synchronisation. Since the various input digital video streams, such as external digital video streams or digital video streams provided by participants, are typically fed to a central server or similar, there is no absolute time to synchronise each such digital video feed to. Like too high latency, unsynchronised digital video feeds will lead to poor user experiences.

Thirdly, multi-party digital video meetings can involve different digital video streams having different encodings or formats, which require decoding and re-encoding in turn producing problems in terms of latency and synchronisation. Such encoding is also computationally burdensome and therefore costly in terms of hardware requirements.

Fourthly, the fact that different digital video sources may be associated with different frame rates, aspect ratios and resolutions may also result in that memory allocation needs may vary unpredictably requiring continuous balancing. This potentially results in additional latency and synchronisation problems. The result is large buffer requirements.

Fifthly, participants may experience various challenges in terms of variable connectivity, leaving/reconnecting etc., posing further challenges in automatically producing a well-formed user experience.

These problems are amplified in more complex meeting situations, for instance involving many participants; participants using different hardware and/or software to connect; externally provided digital video streams; screen-sharing; or multiple hosts.

The corresponding problems arise in the other contexts where an output digital video stream is to be produced based on several input digital video streams, such as in digital video production systems for education and instruction.

Swedish application SE 2151267-8, which has not been published at the effective date of the present application, discloses various solutions to the above-discussed problems.

Swedish application 2151461-7, which also not been published at the effective date of the present application, discloses various solutions specific to the handling of latency in multi-participant digital video environments, such as when different groups of participants are associated with different general latency.

There are still problems related to achieving an automated production of a meeting of the above-discussed types. In particular, in case several cameras are available in such an automated production, it has proven difficult to use the respective image output of such cameras in a way that feels natural and intuitive to a participant of the meeting.

Various embodiments of the present invention solve one or several of the above-described problems.

SUMMARY

The various embodiments of the present invention relate to a system, computer software product and method for producing a digital video stream, and in particular for producing a digital video stream based on two or more different digital input video streams. In preferred embodiments, the digital video stream is produced in the context of a digital video conference or a digital video conference or meeting system, particularly involving a plurality of different concurrent users. The produced digital video stream may be published externally or within a digital video conference or digital video conference system.

Other embodiments are applied in contexts that are not digital video conferences, but where several digital video input streams are handled concurrently and combined into a produced digital video stream. For instance, such contexts may be educational or instructional.

Hence, the various embodiments of the invention relates to a method for providing a shared digital video stream, the method comprising in a collecting step, collecting from a first digital video source a first digital video stream and from a second digital video source a second digital stream; in a first production step, producing the shared digital video stream as an out-put digital video stream based on consecutively considered frames of the first digital video stream so that image information from the first digital video source is visible in the shared digital video stream, but so that image information from the second digital video source is not visible in the shared digital video stream; in a trigger detection step, automatically detecting a trigger by performing at least one of a) digitally analysing the first digital video stream to automatically detect the trigger in the form of a participant depicted in the first digital video stream gazing towards, or making a predetermined gesture in relation to, an object depicted in the second digital video stream, the detection being based on information about a relative orientation of the first camera, the participant and the object, the detection further being based on a digital image-based determination of at least one of a body direction, a head direction, a gaze direction and a gesture direction of the participant in question; and b) digitally analysing the first and/or second digital video stream to automatically detect the trigger in the form of a transition of a gaze direction of the participant depicted in the second digital video stream from not gazing into the second camera to gazing into the second camera, the trigger being instructive, according to a predetermined production rule, to alter the production mode of the shared digital video stream; in a second production step, initiated in response to the detection of the trigger, producing the shared digital video stream as an output digital video stream based on consecutively considered frames of the second digital video stream so that image information from the second digital video source is visible in the shared digital video stream, and/or producing the shared digital video stream as an output digital video stream based on consecutively considered frames of the first digital video source but with at least one of a different cropping, a different zooming, a different panning or a different focus plane selection of the first digital video stream as compared to the first production step; and in a publishing step, continuously providing the output digital video stream to a consumer of the shared digital video stream.

Furthermore, embodiments of the invention relates to a computer software product for providing a shared digital video stream, the computer software function being arranged to, when executing, perform a collecting step, wherein a first digital video stream is collected from a first digital video source and a second digital stream is collected from a second digital video source; a first production step, wherein the shared digital video stream is produced as an output digital video stream based on consecutively considered frames of the first digital video stream so that image information from the first digital video source is visible in the shared digital video stream, but so that image information from the second digital video source is not visible in the shared digital video stream; a trigger detection step, wherein a trigger is automatically detected by performing at least one of a) digitally analysing the first digital video stream to automatically detect the trigger in the form of a participant depicted in the first digital video stream gazing towards, or making a predetermined gesture in relation to, an object depicted in the second digital video stream, the detection being based on information about a relative orientation of the first camera, the participant and the object, the detection further being based on a digital image-based determination of at least one of a body direction, a head direction, a gaze direction and a gesture direction of the participant in question; and b) digitally analysing the first and/or second digital video stream to automatically detect the trigger in the form of a transition of a gaze direction of the participant depicted in the second digital video stream from not gazing into the second camera to gazing into the second camera, the trigger being instructive, according to a predetermined production rule, to alter the production mode of the shared digital video stream; a second production step, initiated in response to the detection of the trigger, wherein the shared digital video stream is produced as an output digital video stream based on consecutively considered frames of the second digital video stream so that image information from the second digital video source is visible in the shared digital video stream, and/or the shared digital video stream is produced as an output digital video stream based on consecutively considered frames of the first digital video source but with at least one of a different cropping, a different zooming, a different panning or a different focus plane selection of the first digital video stream as compared to the first production step; and a publishing step, wherein the output digital video stream is continuously provided to a consumer of the shared digital video stream.

Moreover, embodiments of the invention relates to a system for providing a shared digital video stream, the system comprising a central server in turn comprising a collecting function, arranged to collect from a first digital video source a first digital video stream and from a second digital video source a second digital stream; a first production function, arranged to produce the shared digital video stream as an output digital video stream based on consecutively considered frames of the first digital video stream so that image information from the first digital video source is visible in the shared digital video stream, but so that image information from the second digital video source is not visible in the shared digital video stream; a trigger detection function, arranged to automatically detect a trigger by performing at least one of a) digitally analysing the first digital video stream to automatically detect the trigger in the form of a participant depicted in the first digital video stream gazing towards, or making a predetermined gesture in relation to, an object depicted in the second digital video stream, the detection being based on information about a relative orientation of the first camera, the participant and the object, the detection further being based on a digital image-based determination of at least one of a body direction, a head direction, a gaze direction and a gesture direction of the participant in question; and b) digitally analysing the first and/or second digital video stream to automatically detect the trigger in the form of a transition of a gaze direction of the participant depicted in the second digital video stream from not gazing into the second camera to gazing into the second camera, the trigger being instructive, according to a predetermined production rule, to alter the production mode of the shared digital video stream; a second production function, arranged to be initiated in response to the detection of the trigger, and to produce the shared digital video stream as an output digital video stream based on consecutively considered frames of the second digital video stream so that image information from the second digital video source is visible in the shared digital video stream, and/or to produce the shared digital video stream as an output digital video stream based on consecutively considered frames of the first digital video source but with at least one of a different cropping, a different zooming, a different panning or a different focus plane selection of the first digital video stream as compared to the first production function; and a publishing function, arranged to continuously provide the output digital video stream to a consumer of the shared digital video stream.

BRIEF DESCRIPTION OF THE DRAWINGS

In the following, the invention will be described in detail, with reference to exemplifying embodiments of the invention and to the enclosed drawings, wherein.

All Figures share reference numerals for the same or corresponding parts.

DETAILED DESCRIPTION

Figure 1:
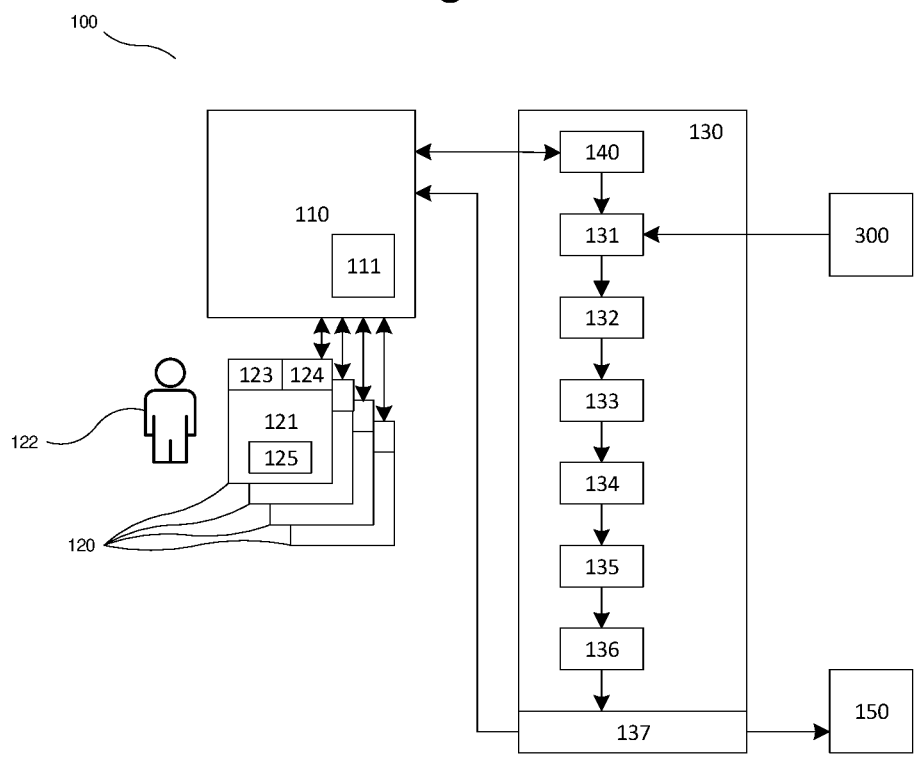
FIG. 1 illustrates a first exemplifying system.

FIG. 1 illustrates a system 100 according to the present invention, arranged to perform a method according to one embodiment of the invention for providing a digital video stream, such as a shared digital video stream.

The system 100 may include a video communication service 110, but the video communication service 110 may also be external to the system 100 in some embodiments. As will be discussed, there may be more than one video communication service 110.

The system 100 may include one or several participant clients 121, but one, some or all participant clients 121 may also be external to the system 100 in some embodiments.

The system 100 may include a central server 130.

As used herein, the term "central server" is a computer-implemented functionality that is arranged to be accessed in a logically centralised manner, such as via a well-defined API (Application Programming Interface). The functionality of such a central server may be implemented purely in computer software, or in a combination of software with virtual and/or physical hardware. It may be implemented on a standalone physical or virtual server computer or be distributed across several interconnected physical and/or virtual server computers.

The physical or virtual hardware that the central server 130 runs on, in other words that computer software defining the functionality of the central server 130, may include a per se conventional CPU, a per se conventional GPU, a per se conventional RAM/ROM memory, a per se conventional computer bus, and a per se conventional external communication functionality such as an internet connection.

Each video communication service 110, to the extent it is used, is also a central server in the sense, which may be a different central server than the central server 130 or a part of the central server 130.

Correspondingly, each of the participant clients 121 may be a central server in the sense, with the corresponding interpretation, and physical or virtual hardware that each participant client 121 runs on, in other words that computer software defining the functionality of the participant client 121, may also include a per se conventional CPU/GPU, a per se conventional RAM/ROM memory, a per se conventional computer bus, and a per se conventional external communication functionality such as an internet connection.

Each participant client 121 also typically includes or is in communication with a computer screen, arranged to display video content provided to the participant client 121 as a part of an ongoing video communication; a loudspeaker, arranged to emit sound content provided to the participant client 121 as a part of the video communication; a video camera; and a microphone, arranged to record sound locally to a human participant 122 to the video communication, the participant 122 using the participant client 121 in question to participate in the video communication.

In other words, a respective human-machine interface of each participating client 121 allows a respective participant 122 to interact with the client 121 in question, in a video communication, with other participants and/or audio/video streams provided by various sources.

In general, each of the participating clients 121 includes a respective input means 123, that may include the video camera; the microphone; a keyboard; a computer mouse or trackpad; and/or an API to receive a digital video stream, a digital audio stream and/or other digital data. The input means 123 is specifically arranged to receive a video stream and/or an audio stream from a central server, such as the video communication service 110 and/or the central server 130, such a video stream and/or audio stream being provided as a part of a video communication and preferably being produced based on corresponding digital data input streams provided to the central server from at least two sources of such digital data input streams, for instance participant clients 121 and/or external sources (see below).

Further generally, each of the participating clients 121 includes a respective output means 124, that may include the computer screen; the loudspeaker; and an API to emit a digital video and/or audio stream, such stream being representative of a captured video and/or audio locally to the participant 122 using the participant client 121 in question.

In practice, each participant client 121 may be a mobile device, such as a mobile phone, arranged with a screen, a loudspeaker, a microphone and an internet connection, the mobile device executing computer software locally or accessing remotely executed computer software to perform the functionality of the participant client 121 in question.

Correspondingly, the participant client 121 may also be a thick or thin laptop or stationary computer, executing a locally installed application, using a remotely accessed functionality via a web browser, and so forth, as the case may be.

There may be more than one, such as at least three or even at least four, participant clients 121 used in one and the same video communication of the present type.

There may be at least two different groups of participating clients. Each of the participating clients may be allocated to such a respective group. The groups may reflect different roles of the participating clients, different virtual or physical locations of the participating clients and/or different interaction rights of the participating clients.

Various available such roles may be, for instance, "leader" or "conferencier," "speaker," "panel participant," "interacting audience" or "remote listener."

Various available such physical locations may be, for instance, "on the stage," "in the panel," "in the physically present audience" or "in the physically remote audience."

A virtual location may be defined in terms of the physical location but may also involve a virtual grouping that may partly overlap with the physical locations. For instance, a physically present audience may be divided into a first and a second virtual group, and some physically present audience participants may be grouped together with some physically distant audience participants in one and the same virtual group.

Various available such interaction rights may be, for instance, "full interaction" (no restrictions), "can talk but only after requesting the microphone" (such as raising a virtual hand in a video conference service), "cannot talk but write in common chat" or "view/listen only."

In some instances, each role defined and/or physical/virtual location may be defined in terms of certain predetermined interaction rights. In other instances, all participants having the same interaction rights form a group. Hence, any defined roles, locations and/or interaction rights may reflect various group allocations, and different groups may be disjoint or overlapping, as the case may be.

This will be exemplified below.

The video communication may be provided at least partly by the video communication service 110 and at least partly by the central server 130, as will be described and exemplified herein.

As the term is used herein, a "video communication" is an interactive, digital communication session involving at least two, preferably at least three or even at least four, video streams, and preferably also matching audio streams that are used to produce one or several mixed or joint digital video/audio streams that in turn is or are consumed by one or several consumers (such as participant clients of the discussed type), that may or may not also be contributing to the video communication via video and/or audio. Such a video communication is real-time, with or without a certain latency or delay. At least one, preferably at least two, or even at least four, participants 122 to such a video communication is involved in the video communication in an interactive manner, both providing and consuming video/audio information.

At least one of the participant clients 121, or all of the participant clients 121, may include a local synchronisation software function 125, that will be described in closer detail below.

The video communication service 110 may include or have access to a common time reference, as will also be described in closer detail below.

Each of the at least one central server 130 may include a respective API 137, for digitally communicating with entities external to the central server 130 in question. Such communication may involve both input and output.

The system 100, such as the central server 130, may furthermore be arranged to digitally communicate with, and in particular to receive digital information, such as audio and/or video stream data, from, an external information source 300, such as an externally provided video stream. That the information source 300 is "external" means that it is not provided from or as a part of the central server 130. Preferably, the digital data provided by the external information source 300 is independent of the central server 130, and the central server 130 cannot affect the information contents thereof. For instance, the external information source 130 may be live captured video and/or audio, such as of a public sporting event or an ongoing news event or reporting. The external information source 130 may also be captured by a web camera or similar, but not by any one of the participating clients 121. Such captured video may hence depict the same locality as any one of the participant clients 121, but not be captured as a part of the activity of the participant client 121 per se. One possible difference between an externally provided information source 300 and an internally provided information source 120 is that internally provided information sources may be provided as, and in their capacity as, participants to a video communication of the above-defined type, whereas an externally provided information source 300 is not, but is instead provided as a part of a context that is external to the video conference There may also be several external information sources 300, that provide digital information of the type, such as audio and/or video streams, to the central server 130 in parallel.

As shown in FIG. 1, each of the participating clients 121 may constitute the source of a respective information (video and/or audio) stream 120, provided to the video communication service 110 by the participating client 121 in question as described.

The system 100, such as the central server 130, may be further arranged to digitally communicate with, and in particular to emit digital information to, an external consumer 150. For instance, a digital video and/or audio stream produced by the central server 130 may be provided continuously, in real-time or near real-time, to one or several external consumers 150 via the API 137. Again, that the consumer 150 is "external" means that the consumer 150 is not provided as a part of the central server 130, and/or that it is not a party to the video communication.

Unless not stated otherwise, all functionality and communication herein are provided digitally and electronically, effected by computer software executing on suitable computer hardware and communicated over a digital communication network or channel such as the internet.

Hence, in the system 100 configuration illustrated in FIG. 1, a number of participant clients 121 take part in a digital video communication provided by the video communication service 110. Each participant client 121 may hence have an ongoing login, session or similar to the video communication service 110, and may take part in one and the same ongoing video communication provided by the video communication service 110. In other words, the video communication is "shared" among the participant clients 121 and therefore also by corresponding human participants 122.

In FIG. 1, the central server 130 includes an automatic participant client 140, being an automated client corresponding to participant clients 121 but not associated with a human participant 122. Instead, the automatic participant client 140 is added as a participant client to the video communication service 110 to take part in the same shared video communication as participant clients 121. As such a participant client, the automatic participant client 140 is granted access to continuously produced digital video and/or audio stream(s) provided as a part of the ongoing video communication by the video communication service 110 and can be consumed by the central server 130 via the automatic participant client 140. Preferably, the automatic participant client 140 receives, from the video communication service 110, a common video and/or audio stream that is or may be distributed to each participant client 121; a respective video and/or audio stream provided to the video communication service 110 from each of one or several of the participant clients 121 and relayed, in raw or modified form, by the video communication service 110 to all or requesting participant clients 121; and/or a common time reference.

The central server 130 may include a collecting function 131 arranged to receive video and/or audio streams of the type from the automatic participant client 140, and possibly also from the external information source(s) 300, for processing as described below, and then to provide a produced, such as shared, video stream via the API 137. For instance, this produced video stream may be consumed by the external consumer 150 and/or by the video communication service 110 to in turn be distributed by the video communication service 110 to all or any requesting one of the participant clients 121.

Figure 2:
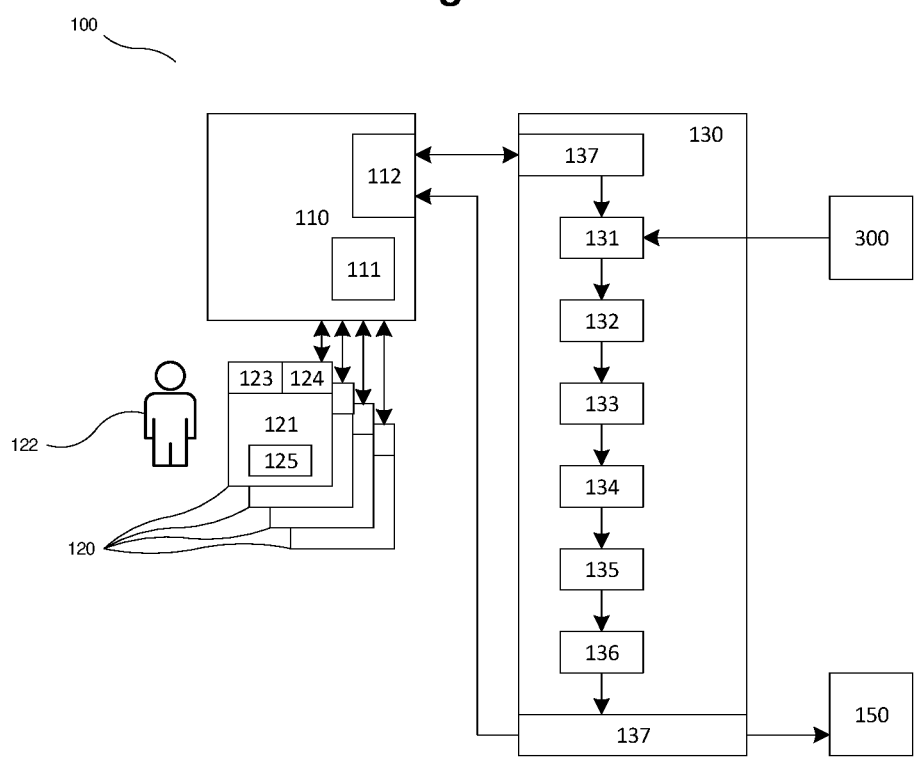
FIG. 2 illustrates a second exemplifying system.

FIG. 2 is similar to FIG. 1, but instead of using the automatic client participant 140 the central server 130 receives video and/or audio stream data from the ongoing video communication via an API 112 of the video communication service 110.

Figure 3:
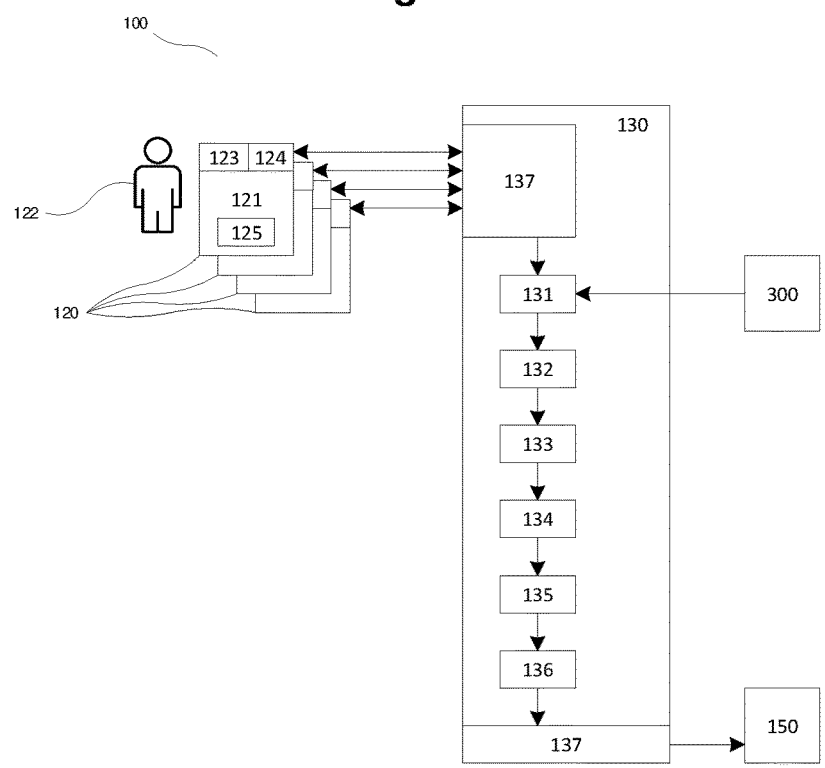
FIG. 3 illustrates a third exemplifying system.

FIG. 3 is also similar to FIG. 1 but shows no video communication service 110. In this case, the participant clients 121 communicate directly with the API 137 of the central server 130, for instance providing video and/or audio stream data to the central server 130 and/or receiving video and/or audio stream data from the central server 130. Then, the produced shared stream may be provided to the external consumer 150 and/or to one or several of the client participants 121.

Figure 4:
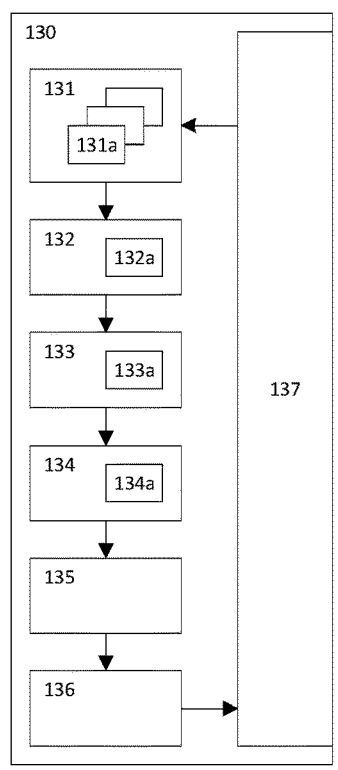
FIG. 4 illustrates a central server.

FIG. 4 illustrates the central server 130 in closer detail. As illustrated, the collecting function 131 may include one or, preferably, several, format-specific collecting functions 131a. Each one of the format-specific collecting functions 131a may be arranged to receive a video and/or audio stream having a predetermined format, such as a predetermined binary encoding format and/or a predetermined stream data container, and may be specifically arranged to parse binary video and/or audio data of the format into individual video frames, sequences of video frames and/or time slots.

The central server 130 may further include an event detection function 132, arranged to receive video and/or audio stream data, such as binary stream data, from the collecting function 131 and to perform a respective event detection on each individual one of the received data streams. The event detection function 132 may include an AI (Artificial Intelligence) component 132a for performing the event detection. The event detection may take place without first time-synchronising the individual collected streams.

The central server 130 further includes a synchronising function 133, arranged to time-synchronise the data streams provided by the collecting function 131 and that may have been processed by the event detection function 132. The synchronising function 133 may include an AI component 133a for performing the time-synchronisation.

The central server 130 may further include a pattern detection function 134, arranged to perform a pattern detection based on the combination of at least one, but in many cases at least two, such as at least three or even at least four, such as all, of the received data streams. The pattern detection may be further based on one, or in some cases at least two or more, events detected for each individual one of the data streams by the event detection function 132. Such detected events taking into consideration by the pattern detection function 134 may be distributed across time with respect to each individual collected stream. The pattern detection function 134 may include an AI component 134a for performing the pattern detection. The pattern detection may further be based on the above-discussed grouping, and in particular be arranged to detect a particular pattern occurring only with respect to one group; with respect to only some but not all groups; or with respect to all groups.

The central server 130 further includes a production function 135, arranged to produce a produced digital video stream, such as a shared digital video stream, based on the data streams provided from the collecting function 131, and possibly further based on any detected events and/or patterns. Such a produced video stream may at least include a video stream produced to include one or several of video streams provided by the collecting function 131, raw, reformatted or transformed, and may also include corresponding audio stream data. As will be exemplified below, there may be several produced video streams, where one such produced video stream may be produced in the above-discussed way but further based on a another already produced video stream.

All produced video streams are preferably produced continuously, and preferably in near real-time (after discounting any latencies and delays of the types discussed hereinbelow).

The central server 130 may further include a publishing function 136, arranged to publish the produced digital video stream in question, such as via API 137 as described above.

It is noted that FIGS. 1, 2 and 3 illustrate three different examples of how the central server 130 can be used to implement the principles described herein, and in particular to provide a The method of the present invention, but that other configurations, with or without using one or several video communication services 110, are also possible.

Figure 5:
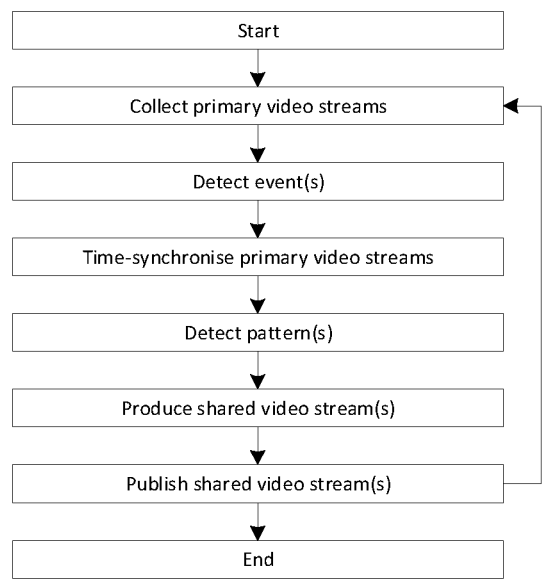
FIG. 5 illustrates a first method.

Hence, FIG. 5 illustrates a method for providing the produced digital video stream. FIGS. 6a-6f illustrates different digital video/audio data stream states resulting from the method steps illustrated in FIG. 5.

In a first step, the method starts.

In a subsequent collecting step, respective primary digital video streams 210, 301 are collected, such as by the collecting function 131, from at least two of the digital video sources 120, 300. Each such primary data stream 210, 301 may include an audio part 214 and/or a video part 215. It is understood that "video," in this context, refers to moving and/or still image contents of such a data stream. Each primary data stream 210, 301 may be encoded according to any video/audio encoding specification (using a respective codec used by the entity providing the primary stream 210, 301 in question), and the encoding formats may be different across different ones of the primary streams 210, 301 concurrently used in one and the same video communication. It is preferred that at least one, such as all, of the primary data streams 210, 301 is provided as a stream of binary data, possibly provided in a per se conventional data container data structure. It is preferred that at least one, such as at least two, or even all of the primary data streams 210, 301 are provided as respective live video recordings.

It is noted that the primary streams 210, 301 may be unsynchronised in terms of time when they are received by the collecting function 131. This may mean that they are associated with different latencies or delays in relation to each other. For instance, in case two primary video streams 210, 301 are live recordings, this may imply that they are associated, when received by the collecting function 131, with different latencies with respect to the time of recording.

It is also noted that the primary streams 210, 301 may themselves be a respective live camera feed from a web camera; a currently shared screen or presentation; a viewed film clip or similar; or any combination of these arranged in various ways in one and the same screen.

Figure 6A:
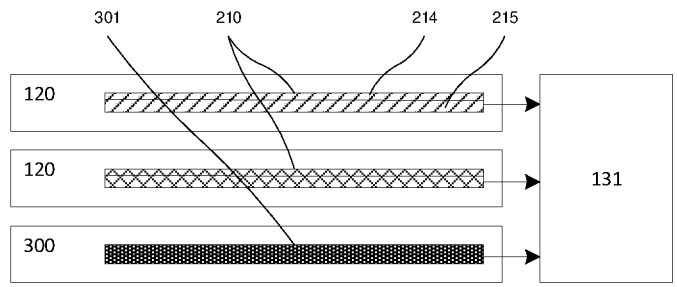
FIGS. 6a-6f illustrate subsequent states in relation to the different method steps in the method illustrated in FIG. 5.
Figure 6B:
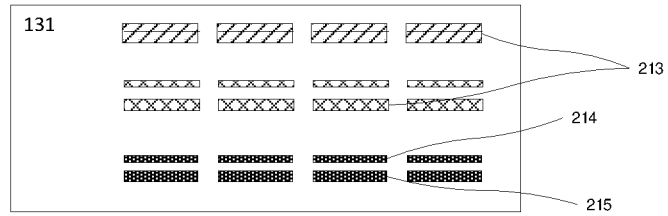

The collecting step is shown in FIGS. 6a and 6b. In FIG. 6b, it is also illustrated how the collecting function 131 can store each primary video stream 210, 301 as bundled audio/video information or as audio stream data separated from associated video stream data. FIG. 6b illustrates how the primary video stream 210, 301 data is stored as individual frames 213 or collections/clusters of frames, "frames" here referring to time-limited parts of image data and/or any associated audio data, such as each frame being an individual still image or a consecutive series of images (such as such a series constituting at the most 1 second of moving images) together forming moving-image video content.

Figure 6C:
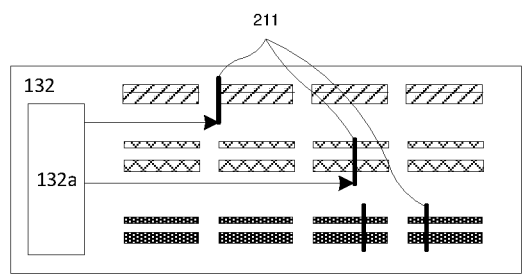

In a subsequent event detection step, performed by the event detection function 132, the primary digital video streams 210, 301 are analysed, such as by the event detection function 132 and in particular the AI component 132a, to detect at least one event 211 selected from a first set of events. This is illustrated in FIG. 6c.

It is preferred that this event detections step may be performed for at least one, such as at least two, such as all, primary video streams 210, 301, and that it may be performed individually for each such primary video stream 210, 301. In other words, the event detection step preferably takes place for the individual primary video stream 210, 301 only taking into consideration information contained as a part of that particular primary video stream 210, 301 in question, and particularly without taking into consideration information contained as a part of other primary video streams. Furthermore, the event detection preferably takes place without taking into consideration any common time reference 260 associated with the several primary video streams 210, 301.

On the other hand, the event detection preferably takes into consideration information contained as a part of the individually analysed primary video stream in question across a certain time interval, such as a historic time interval of the primary video stream that is longer than 0 seconds, such as at least 0.1 seconds, such as at least 1 second.

The event detection may take into consideration information contained in audio and/or video data contained as a part of the primary video stream 210, 301.

The first set of events may contain any number of types of events, such as a change of slides in a slide presentation constituting or being a part of the primary video stream 210, 301 in question; a change in connectivity quality of the source 120, 300 providing the primary video stream 210, 301 in question, resulting in an image quality change, a loss of image data or a regain of image data; and a detected movement physical event in the primary video stream 210, 301 in question, such as the movement of a person or object in the video, a change of lighting in the video, a sudden sharp noise in the audio or a change of audio quality. It is realised that this is not intended to be an exhaustive list, but that these examples are provided in order to understand the applicability of the presently described principles.

Figure 6D:
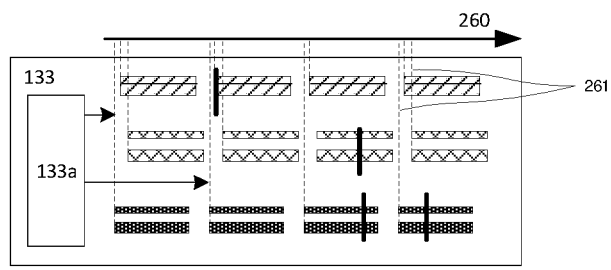

In a subsequent synchronising step, performed by the synchronisation function 133, the primary digital video streams 210 are time synchronised. This time-synchronisation may be with respect to a common time reference 260. As illustrated in FIG. 6d, the time-synchronisation may involve aligning the primary video streams 210, 301 in relation to each other, for instance using the common time reference 260, so that they can be combined to form a time-synchronised context. The common time reference 260 may be a stream of data, a heartbeat signal or other pulsed data, or a time anchor applicable to each of the individual primary video streams 210, 301. The common time reference can be applied to each of the individual primary video streams 210, 301 in a way so that the informational contents of the primary video stream 210, 301 in question can be unambiguously related to the common time reference with respect to a common time axis. In other words, the common time reference may allow the primary video streams 210, 301 to be aligned, via time shifting, so as to be time-synchronised in the present sense. In other embodiments, the time-synchronisation may be based on known information about a time difference between the primary video streams 210, 301 in question, such as based on measurements.

As illustrated in FIG. 6d, the time-synchronisation may include determining, for each primary video streams 210, 301, one or several timestamps 261, such as in relation to the common time reference 260 or for each video stream 210, 301 in relation to another video stream 210, 301 or to other video streams 210, 301.

Figure 6E:
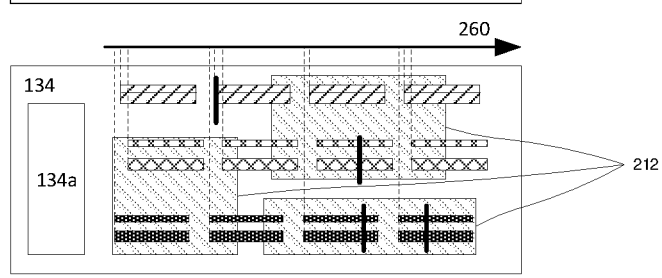

In a subsequent pattern detection step, performed by the pattern detection function 134, the hence time-synchronised primary digital video streams 210, 301 are analysed to detect at least one pattern 212 selected from a first set of patterns. This is illustrated in FIG. 6e.

In contrast to the event detection step, the pattern detection step may preferably be performed based on video and/or audio information contained as a part of at least two of the time-synchronised primary video streams 210, 301 considered jointly.

The first set of patterns may contain any number of types of patterns, such as several participants talking interchangeably or concurrently; or a presentation slide change occurring concurrently as a different event, such as a different participant talking. This list is not exhaustive, but illustrative.

In alternative embodiments, detected patterns 212 may relate not to information contained in several of the primary video streams 210, 301 but only in one of the primary video streams 210, 301. In such cases, it is preferred that such pattern 212 is detected based on video and/or audio information contained in that single primary video stream 210, 301 spanning across at least two detected events 211, for instance two or more consecutive detected presentation slide changes or connection quality changes. As an example, several consecutive slide changes that follow on each other rapidly over time may be detected as one single slide change pattern, as opposed to one individual slide change pattern for each detected slide change event.

It is realised that the first set of events and the first set of patterns may include events/patterns being of predetermined types, defined using respective sets of parameters and parameter intervals. As will be explained below, the events/patterns in the sets may also, or additionally, be defined and detected using various AI tools.

In a subsequent production step, performed by the production function 135, the shared digital video stream is produced as an output digital video stream 230 based on consecutively considered frames 213 of the time-synchronised primary digital video streams 210, 301 and the detected patterns 212.

As will be explained and detailed in the following, the present invention allows for the completely automatic production of video streams, such as of the output digital video stream 230.

For instance, such production may involve the selection of what video and/or audio information from what primary video stream 210, 301 to use to what extent in such output video stream 230; a video screen layout of an output video stream 230; a switching pattern between different such uses or layouts across time; and so forth.

Figure 6F:
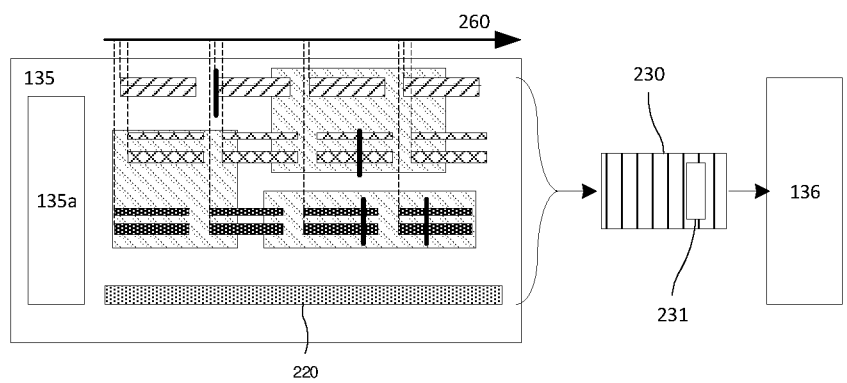

This is illustrated in FIG. 6f, that also shows one or several additional pieces of time-related (that may be related to the common time reference 260) digital video information 220, such as an additional digital video information stream, that can be time-synchronised (such as to the common time reference 260) and used in concert with the time-synchronised primary video streams 210, 301 in the production of the output video stream 230. For instance, the additional stream 220 may include information with respect to any video and/or audio special effects to use, such as dynamically based on detected patterns; a planned time schedule for the video communication; and so forth.

In a subsequent publishing step, performed by the publishing function 136, the produced output digital video stream 230 is continuously provided to a consumer 110, 150 of the produced digital video stream as described above. The produced digital video stream may be provided to one or several participant clients 121, such as via the video communication service 110.

In a subsequent step, the method ends. However, first the method may iterate any number of times, as illustrated in FIG. 5, to produce the output video stream 230 as a continuously provided stream. Preferably, the output video stream 230 is produced to be consumed in real-time or near real-time (taking into consideration a total latency added by all steps along the way), and continuously (publishing taking place immediately when more information is available, however not counting the below-described deliberately added latencies or delays). This way, the output video stream 230 may be consumed in an interactive manner, so that the output video stream 230 may be fed back into the video communication service 110 or into any other context forming a basis for the production of a primary video stream 210 again being fed to the collection function 131 so as to form a closed feedback loop; or so that the output video stream 230 may be consumed into a different (external to system 100 or at least external to the central server 130) context but there forming the basis of a real-time, interactive video communication.

As mentioned above, in some embodiments at least two, such as at least three, such as at least four, or even at least five, of the primary digital video streams 210, 301 are provided as a part of a shared digital video communication, such as provided by the video communication service 110, the video communication involving a respective remotely connected participant client 121 providing the primary digital video stream 210 in question. In such cases, the collecting step may include collecting at least one of the primary digital video streams 210 from the shared digital video communication service 110 itself, such as via an automatic participant client 140 in turn being granted access to video and/or audio stream data from within the video communication service 110 in question; and/or via an API 112 of the video communication service 110.

Moreover, in this and in other cases the collecting step may include collecting at least one of the primary digital video streams 210, 301 as a respective external digital video stream 301, collected from an information source 300 being external to the shared digital video communication service 110. It is noted that one or several used such external video sources 300 may also be external to the central server 130.

In some embodiments, the primary video streams 210, 301 are not formatted in the same manner. Such different formatting can be in the form of them being delivered to the collecting function 131 in different types of data containers (such as AVI or MPEG), but in preferred embodiments at least one of the primary video streams 210, 301 is formatted according to a deviating format (as compared to at least one other of the primary video streams 210, 301) in terms of the deviating primary digital video stream 210, 301 having a deviating video encoding; a deviating fixed or variable frame rate; a deviating aspect ratio; a deviating video resolution; and/or a deviating audio sample rate.

It is preferred that the collecting function 131 is preconfigured to read and interpret all encoding formats, container standards, etc. that occur in all collected primary video streams 210, 301. This makes it possible to perform the processing as described herein, not requiring any decoding until relatively late in the process (such as not until after the primary stream in question is put in a respective buffer; not until after the event detection step; or even not until after the event detection step). However, in the rare case in which one or several of the primary video feeds 210, 301 are encoded using a codec that the collecting function 131 cannot interpret without decoding, the collecting function 131 may be arranged to perform a decoding and analysis of such primary video stream 210, 301, followed by a conversion into a format that can be handled by, for instance, the event detection function. It is noted that, even in this case, it is preferred not to perform any reencoding at this stage.

For instance, primary video streams 220 being fetched from multi-party video events, such as one provided by the video communication service 110, typically have requirements on low latency and are therefore typically associated with variable framerate and variable pixel resolution to enable participants 122 to have an effective communication. In other words, overall video and audio quality will be decreased as necessary for the sake of low latency.

External video feeds 301, on the other hand, will typically have a more stable framerate, higher quality but therefore possibly higher latency.

Hence, the video communication service 110 may, at each moment in time, use a different encoding and/or container than the external video source 300. The analysis and video production process described herein in this case therefore needs to combine these streams 210, 301 of different formats into a new one for the combined experience.

As mentioned above, the collecting function 131 may include a set of format-specific collecting functions 131a, each one arranged to process a primary video stream 210, 301 of a particular type of format. For instance, each one of these format-specific collecting functions 131a may be arranged to process primary video streams 210, 301 having been encoded using a different video respective encoding method/codec, such as Windows® Media® or Divx®.

However, in preferred embodiments the collecting step includes converting at least two, such as all, of the primary digital video streams 210, 301 into a common protocol 240.

As used in this context, the term "protocol" refers to an information-structuring standard or data structure specifying how to store information contained in a digital video/audio stream. The common protocol preferably does not, however, specify how to store the digital video and/or audio information as such on a binary level (i.e. the encoded/compressed data instructive of the sounds and images themselves), but instead forms a structure of predetermined format for storing such data. In other words, the common protocol prescribes storing digital video data in raw, binary form without performing any digital video decoding or digital video encoding in connection to such storing, possibly by not at all amending the existing binary form apart from possibly concatenating and/or splitting apart the binary form byte sequence. Instead, the raw (encoded/compressed) binary data contents of the primary video stream 210, 301 in question is kept, while repacking this raw binary data in the data structure defined by the protocol. In some embodiments, the common protocol defines a video file container format.

Figure 7:
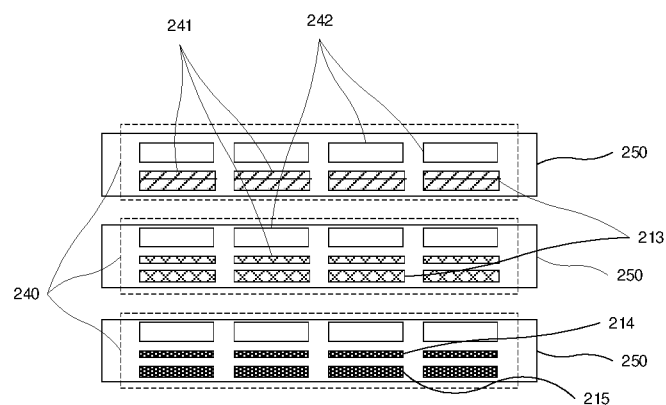
FIG. 7 illustrates, conceptually, a common protocol.

FIG. 7 illustrates, as an example, the primary video streams 210, 301 shown in FIG. 6a, restructured by the respective format-specific collecting function 131a, and using the common protocol 240.

Hence, the common protocol 240 prescribes storing digital video and/or audio data in data sets 241, preferably divided into discreet, consecutive sets of data along a timeline pertaining to the primary video stream 210, 301 in question. Each such data set may include one or several video frames, and also associated audio data.

The common protocol 240 may also prescribe storing metadata 242 associated with specified time points in relation to the stored digital video and/or audio data sets 241.

The metadata 242 may include information about the raw binary format of the primary digital video stream 210 in question, such as regarding a digital video encoding method or codec used to produce the raw binary data; a resolution of the video data; a video frame rate; a frame rate variability flag; a video resolution; a video aspect ratio; an audio compression algorithm; or an audio sampling rate. The metadata 242 may also include information on a timestamp of the stored data, such as in relation to a time reference of the primary video stream 210, 301 in question as such or to a different video stream as discussed above.

Using the format-specific collecting functions 131a in combination with the common protocol 240 makes it possible to quickly collect the informational contents of the primary video streams 210, 301 without adding latency by decoding/reencoding the received video/audio data.

Hence, the collecting step may include using different ones of the format-specific collecting functions 131a for collecting primary digital video streams 210, 301 being encoded using different binary video and/or audio encoding formats, in order to parse the primary video stream 210, 301 in question and store the parsed, raw and binary data in a data structure using the common protocol, together with any relevant metadata. Self-evidently, the determination as to what format-specific collecting function 131a to use for what primary video stream 210, 301 may be performed by the collecting function 131 based on predetermined and/or dynamically detected properties of each primary video stream 210, 301 in question.

Each hence collected primary video stream 210, 301 may be stored in its own separate memory buffer, such as a RAM memory buffer, in the central server 130.

The converting of the primary video streams 210, 301 performed by each format-specific collecting function 131a may hence include splitting raw, binary data of each thus converted primary digital video stream 210, 301 into an ordered set of the smaller sets of data 241.

Moreover, the converting may also include associating each (or a subset, such as a regularly distributed subset along a respective timeline of the primary stream 210, 301 in question) of the smaller sets 241 with a respective time along a shared timeline, such as in relation to the common time reference 260. This associating may be performed by analysis of the raw binary video and/or audio data in any of the principal ways described below, or in other ways, and may be performed in order to be able to perform the subsequent time-synchronising of the primary video streams 210, 301. Depending on the type of common time reference used, at least part of this association of each of the data sets 241 may also or instead be performed by the synchronisation function 133. In the latter case, the collecting step may instead include associating each, or a subset, of the smaller sets 241 with a respective time of a timeline specific for the primary stream 210, 301 in question.

In some embodiments, the collecting step also includes converting the raw binary video and/or audio data collected from the primary video streams 210, 301 into a uniform quality and/or updating frequency. This may involve down-sampling or up-sampling of the raw, binary digital video and/or audio data of the primary digital video streams 210, 301, as necessary, to a common video frame rate; a common video resolution; or a common audio sampling rate. It is noted that such re-sampling can be performed without performing a full decoding/reencoding, or even without performing any decoding at all, since the format-specific collecting function 131a in question can process the raw binary data directly according to the correct binary encoding target format.

Each of the primary digital video streams 210, 301 may be stored in an individual data storage buffer 250, as individual frames 213 or sequences of frames 213 as described above, and also each associated with a corresponding time stamp in turn associated with the common time reference 260.

In a concrete example, provided to illustrate these principles, the video communication service 110 is Microsoft® Teams®, running a video conference involving concurrent participants 122. The automatic participant client 140 is registered as a meeting participant in the Teams® meeting.

Then, the primary video input signals 210 are available to and obtained by the collecting function 130 via the automatic participant client 140. These are raw signals in H264 format and contain timestamp information for every video frame.

The relevant format-specific collecting function 131a picks up the raw data over IP (LAN network in the cloud) on a configurable predefined TCP port. Every Teems® meeting participant, as well as associated audio data, are associated with a separate port. The collecting function 131 then uses the timestamps from the audio signal (which is in 50 Hz) and down-samples the video data to a fixed output signal of 25 Hz before storing the video stream 220 in its respective individual buffer 250.

As mentioned, the common protocol 240 may store the data in raw binary form. It can be designed to be very low-level, and to handle the raw bits and bytes of the video/audio data. In preferred embodiments, the data is stored in the common protocol 240 as a simple byte array or corresponding data structure (such as a slice). This means that the data does not need to be put in a conventional video container at all (the common protocol 240 not constituting such conventional container in this context). Also, encoding and decoding video is computationally heavy, which means it causes delays and requires expensive hardware. Moreover, this problem scales with the number of participants.

Using the common protocol 240, it becomes possible to reserve memory in the collecting function 131 for the primary video stream 210 associated with each Teams® meeting participant 122, and also for any external video sources 300, and then to change the amount of memory allocated on the fly during the process. This way, it becomes possible to change the number of input streams and as a result keep each buffer effective. For instance, since information like resolution, framerate and so forth may be variable but stored as metadata in the common protocol 240, this information can be used to quickly resize each buffer as need may be.

The following is an example of a specification of a common protocol 240 of the present type:

| Bytes | Example | Description |
| --- | --- | --- |
| 1 byte | 1 | 0 = video; 1 = audio |
| 4 bytes | 1234567 | Buffer Length (int) |
| 8 bytes | 424234234 | Timestamp from the incoming audio/video buffer |
| | | Measured in ticks, 1tick = 100 ns. (long int) |

-continued

| Bytes | Example | Description |
|---|---|---|
| 1 byte | 0 | VideoColorFormat<br>{<br>NV12 = 0,<br>Rgb24 = 1,<br>Yuy2 = 2,<br>H264 = 3<br>} |
| 4 bytes | 720 | Video frame pixel height (int) |
| 4 bytes | 640 | Video frame pixel width (int) |
| 4 bytes | 25.0 | Video frame rate<br>Number of frames per second (float) |
| 1 byte | 0 | Is audio silence? 1 = true; 0 = false |
| 1 byte | 0 | AudioFormat<br>{<br>0 = Pcm16K<br>1 = Pcm44KStereo<br>} |
| 1 byte | 0 | Detected event in, if any<br>0 = no event<br>1, 2, 3, etc. = event of specified type detected |
| 30 bytes | | Reserved for future use |
| 8 bytes | 1000000 | Length of binary data in bytes (long int) |
| Variable | 0x87A879 ... | Raw binary video/audio data of this frame(s) |
| 4 bytes | 1234567 | Dominant speaker Port |
| 4 bytes | 1234567 | Active speaker |

Above, the "Detected event in, if any" data is included as a part of the common protocol 260 specification. However, in some embodiments, this information (regarding detected events) may instead be put in a separate memory buffer.

In some embodiments, the at least one additional piece of digital video information 220, that may be an overlay or an effect, is also stored in a respective individual buffer 250, as individual frames or sequences of frames each associated with a corresponding time stamp in turn associated with the common time reference 260.

As exemplified above, the event detection step may include storing, using the common protocol 240, metadata 242 descriptive of a detected event 211, associated with the primary digital video stream 210, 301 in which the event 211 in question was detected.

The event detection can be performed in different ways. In some embodiments, performed by the AI component 132a, the event detection step includes a first trained neural network or other machine learning component analysing at least one, such as several or even all, of the primary digital video streams 210, 301 individually in order to automatically detect any of the events 211. This may involve the AI component 132a classifying, in a managed classification, the primary video stream 210, 301 data into a set of predefined events and/or, in an unmanaged classification, into a dynamically determined set of events.

In some embodiments, the detected event 211 is a change of presentation slides in a presentation being or being included in the primary video stream 210, 301 in question.

For instance, if the presenter of the presentation decides to change the slide in the presentation he/she is giving at that time to an audience, this means that what is interesting for a given viewer can change. It may be that the newly shown slide is only a high-level picture that can best be seen briefly in a so-called "butterfly" mode (for instance, displaying in the output video stream 230 the slide side-by-side with a video of the presenter). Alternatively, the slide may contain much detail, text with small font sizes, and so forth. In this latter case, the slide should instead be presented in full-screen and perhaps during a somewhat longer time period than what is usually the case. A butterfly mode may not be as appropriate, since the slide in this case may be more interesting to a viewer of the presentation than the face of the presenter.

In practice, the event detection step may include at least one of the following:

Firstly, the event 211 can be detected based on an image analysis of a difference between a first image of a detected slide and a subsequent second image of a detected slide. The nature of the primary video stream 220, 301 being that of showing a slide can be automatically determined using per se conventional digital image processing, such as using motion detection in combination with OCR (Optical Character Recognition).

This may involve checking, using automatic computer image processing techniques, whether the detected slide has changed significantly enough to actually categorise it as a slide change. This may be done by checking the delta between current slide and previous slide with respect to RGB colour values. For instance, one may assess how much the RGB values have changed globally in the screen area covered by the slide in question, and whether it is possible to find groups of pixels that belong together and that change in concert. This way, relevant slide changes can be detected while, for instance, filtering out irrelevant changes such as shown computer mouse movements across the screen. This approach also allows full configurability—for instance, sometimes it is desired to be able to capture computer mouse movement, for instance when the presenter wishes to present something in detail using the computer mouse to point to different things.

Secondly, the event 211 may be detected based on an image analysis of an informational complexity of the second image itself, to determine the type of event with greater specificity.

This may, for instance, involve assessing a total amount of textual information on the slide in question, as well as associated font sizes. This may be done by using conventional OCR methods, such as deep learning-based character recognition techniques.

It is noted that, since the raw binary format of the assessed video stream 210, 301 is known, this may be performed directly in the binary domain, without first decoding or reencoding the video data. For instance, the event detection function 132 may call the relevant format-specific collecting function for image interpreting services, or the event detection function 132 may itself include functionality for assessing image information, such as on individual pixel level, for a number of different supported raw binary video data formats.

In another example, the detected event 211 is a loss of communication connection of a participant client 121 to a digital video communication service 110. Then, the detection step may include detecting that the participant client 121 has lost communication connection based on an image analysis of a series of subsequent video frames 213 of a primary digital video stream 210 corresponding to the participant client 121 in question.

Because participant clients 121 are associated with different physical locations and different internet connections, it can happen that someone will lose connection to the video communication service 110 or to the central server 130. In that situation, it is desirable to avoid showing a black or empty screen in the produced output video stream 230.

Instead, such connection loss can be detected as an event by the event detection function 132, such as by applying a 2-class classification algorithm where the 2 classes used are connected/not connected (no data). In this case, it is understood that "no data" differs from the presenter sending out a black screen intentionally. Because a brief black screen, such as of only 1 or 2 frames, may not be noticeable in the end production stream 230, one may apply the 2-class classification algorithm over time to create a time series. Then, a threshold value, specifying a minimum length for a connection interruption, can be used to decide whether there is a lost connection or not.

As will be explained in the following, detected events of these exemplified types may be used by the pattern detection function 134 to take various actions, as suitable and desired.

As mentioned, the individual primary video streams 210, 301 may each be related to the common time reference 260 or to each other in the time domain, making it possible for the synchronisation function 133 to time-synchronise them in relation to each other.

In some embodiments, the common time reference 260 is based on or includes a common audio signal 111 (see FIGS. 1-3), the common audio signal 111 being common for the shared digital video communication service 110 involving at least two remotely connected participant clients 121 as described above, each providing a respective one of the primary digital video streams 210.

In the example of Microsoft® Teams® discussed above, a common audio signal is produced and can be captured by the central server 130 via the automatic participant client 140 and/or via the API 112. In this and in other examples, such a common audio signal may be used as a heartbeat signal to time-synchronise the individual primary video streams 220 by binding each of these to specific time points based on this heartbeat signal. Such a common audio signal may be provided as a separate (in relation to each of the other primary video streams 210) signal, whereby the other primary video streams 210 may each be individually time-correlated to the common audio signal, based on audio contained in the other primary video stream 210 in question or even based on image information contained therein (such as using automatic image processing-based lip syncing techniques).

In other words, to handle any variable and/or differing latency associated with individual primary video streams 210, and to achieve time-synchronisation for the combined video output stream 230, such a common audio signal is used as a heartbeat for all primary video streams 210 in the central server 130 (but perhaps not external primary video streams 301). In other words, all other signals are mapped to this common audio time heartbeat to make sure that everything is in time sync.

In a different example, the time-synchronisation is achieved using a time synchronisation element 231 introduced into the output digital video stream 230 and detected by a respective local time-synchronising software function 125 provided as a part of one or several individual ones of the participant clients 121, the local software function 125 being arranged to detect a time of arrival of the time synchronisation element 231 in the output video stream 230. As is understood, in such embodiments the output video stream 230 is fed back into the video communication service 110 or otherwise made available to each participant client 121 and the local software function 125 in question.

For instance, the time synchronisation element 231 may be a visual marker, such as a pixel changing colours in a predetermined sequence or manner, placed or updated in the output video 230 at regular time intervals; a visual clock updated and displayed in the output video 230; a sound signal (that may be designed to be non-audible to participants 122 by, for instance, having low enough amplitude and/or high enough frequency) and added to an audio forming part of the output video stream 230. The local software function 125 is arranged to, using suitable image and/or audio processing, automatically detect respective times of arrival of each of the (or each of the) time synchronisation element(s) 231.

Then, the common time reference 260 may be determined at least partly based on the detected times of arrival. For instance, each of the local software functions 125 may communicate to the central server 130 respective information signifying the detected time of arrival.

Such communication may take place via a direct communication link between the participant client 121 in question and the central server 130. However, the communication may also take place via the primary video stream 210 associated with the participant client 121 in question. For instance, the participating client 121 may introduce a visual or audible code, such as of the above discussed type, in the primary video stream 210 produced by that participant client 121 in question, for automatic detection by the central server 130 and used to determine the common time reference 260.

In yet additional examples, each participant client 121 may perform an image detection in a common video stream available for viewing by all participant clients 121 to the video communication service 110 and relay the results of such image detection to the central server 130, in a way corresponding to the ones discussed above, to there be used to over time determine respective offsets of each participant client 121 in relation to each other. This way, a common time reference 260 may be determined as a set of individual relative offsets. For instance, a selected reference pixel of a commonly available video stream may be monitored by several, or all, participating clients 121, such as by the local software function 125, and a current colour of that pixel may be communicated to the central server 130. The central server 130 may calculate a respective time series based on consecutively received such colour values from each of a number of (or all) the participant clients 121 and perform a cross-correlation resulting in an estimated set of relative time offsets across the different participant clients 121.

In practice, the output video stream 230 fed into the video communication service 110 may be included as a part of a shared screen every participant client of the video communication in question and may therefore be used to assess such time offset associated with the participant clients 121. In particular, the output video stream 230 fed to the video communication service 110 may be available again to the central server via the automatic participant client 140 and/or the API 112.

In some embodiments, a common time reference 260 may be determined at least partly based on a detected discrepancy between an audio part 214 of a first one of the primary digital video streams 210, 301 and an image part 215 of the first primary digital video streams 210, 301. Such discrepancy may, for instance, be based on a digital lip sync video image analysis of a talking participant 122 viewed in the first primary digital video stream 210, 301 in question. Such lip sync analysis is conventional as such and may for instance use a trained neural network. The analysis may be performed by the synchronisation function 133 for each primary video stream 210, 301 in relation to available common audio information, and relative offsets across the individual primary video streams 210, 301 may be determined based on this information.

In some embodiments, the synchronisation step includes deliberately introducing a delay (in this context the terms "delay" and "latency" are intended to mean the same thing)

of at the most 30 seconds, such as at the most 5 seconds, such as at the most 1 seconds, such as at the most 0.5 seconds, but longer than 0 s, so that the output digital video stream 230 is provided at least with the delay. At any rate, the deliberately introduced delay is at least several video frames, such as at least three, or even at least five or even 10, video frames, such as this number of frames (or individual images) stored after any resampling in the collecting step. As used herein, the term "deliberately" means that the delay is introduced irrespective of any need for introducing such a delay based on synchronisation issues or similar. In other words, the deliberately introduced delay is introduced in addition to any delay introduced as a part of the synchronisation of the primary video streams 210, 301 in order to time-synchronise them one in relation to the other. The deliberately introduced delay may be predetermined, fixed or variable in relation to the common time reference 260. The delay time may be measured in relation to a least latent one of the primary video streams 210, 301, so that more latent ones of these streams 210, 301 as a result of the time-synchronisation are associated with a relatively smaller deliberately added delay.

In some embodiments, a relatively small delay is introduced, such as of 0.5 seconds or less. This delay will barely be noticeable by participants to a video communication service 110 using the output video stream 230. In other embodiments, such as when the output video stream 230 will not be used in an interactive context but is instead published in a one-way communication to an external consumer 150, a larger delay may be introduced.

This deliberately introduced delay may be enough so as to achieve sufficient time for the synchronisation function 133 to map the collected individual primary stream 210, 301 video frames onto the correct common time reference 260 timestamp 261. It may also be enough so as to allow sufficient time to perform the event detection described above, in order to detect lost primary stream 210, 301 signals, slide changes, resolution changes, and so forth. Furthermore, deliberately introducing the delay may be enough so as to allow for an improved pattern detection function 134, as will be described in the following.

It is realized that the introduction of the delay may involve buffering 250 each of the collected and time-synchronised primary video streams 210, 301 before publishing the output video stream 230 using the buffered frames 213 in question. In other words, video and/or audio data of at least one, several or even all of the primary video streams 210, 301 may then be present in the central server 130 in a buffered manner, much like a cache but not (like a conventional cache buffer) used with the intention of being able to handle varying bandwidth situations but for the above reasons, and in particular to be used by the pattern detection function 134.

Hence, in some embodiments the pattern detection step includes taking into consideration certain information of at least one, such as several, such as at least four, or even all, of the primary digital video streams 210, 301, the certain information being present in a later frame 213 than a frame of a time-synchronised primary digital video stream 210 yet to be used in the production of the output digital video stream 230. Hence, a newly added frame 213 will exist in the buffer 250 in question during a particular latency time before forming part of (or basis for) the output video stream 230. During this time period, the information in the frame 213 in question will constitute information in the "future" in relation to a currently used frame to produce a current frame of the output video stream 230. Once the output video stream 230 timeline reaches the frame in question 213, it will be used for the production of the corresponding frame of the output video stream 230 and may thereafter be discarded.

In other words, the pattern detection function 134 has at its disposal a set of video/audio frames 213 that have still not been used to produce the output video stream 230 and may use this data to detect the patterns.

The pattern detection can be performed in different ways. In some embodiments, performed by the AI component 134a, the pattern detection step includes a second trained neural network or other machine learning component analysing at least two, such as at least three, such as at least four, or even all, of the primary digital video streams 120, 301 in concert to automatically detect the pattern 212.

In some embodiments, the detected pattern 212 includes a speaking pattern involving at least two, such as at least three, such as at least four, different speaking participants 122, each associated with a respective participant client 121, to the shared video communication service 110, each of the speaking participants 122 being viewed visually in a respective one of the primary digital video streams 210, 301.

The production step preferably includes determining, keeping track of, and updating a current production state of the output video stream 230. For instance, such a state can dictate what, if any, participants 122 are visible in the output video stream 230, and where on the screen; if any external video stream 300 is visible in the output video stream 230, and where on the screen; if any slides or shared screens are shown in full-screen mode or in combination with any live video streams; and so on. Hence, the production function 135 can be viewed as a state machine with respect to the produced output video stream 230.

To generate the output video stream 230 as a combined video experience to be viewed by, for instance, an end consumer 150, it is advantageous for the central server 130 to be able to understand what happens on a deeper level than merely detecting individual events associated with individual primary video streams 210, 301.

In a first example, a presenting participant client 121 is changing a currently viewed slide. This slide change is detected by the event detection function 132 as described above, and metadata 242 is added to the frame in question indicative of a slide change having happened. This happens a number of times, since the presenting participating client 121 turns out to skip a number of slides forward in rapid succession, resulting in a series of "slide change" events detected by the even detection function 132 and stored with corresponding metadata 242 in the individual buffer 250 for the primary video stream 210 in question. In practice, each such rapidly forward skipped slide may be visible for only a fraction of a second.

The pattern detection function 134, looking at the information in the buffer 250 in question, spanning across several of these detected slide changes, will detect a pattern corresponding to one single slide change (that is, to the last slide in the forward-skipping, the slide remaining visible once the rapid skipping is finished), rather than a number or rapidly performed slide changes. In other words, the pattern detection function 134 will note that there are, for instance, ten slide changes in a very short period of time, why they will be handled as a detected pattern signifying one single slide change. As a result, the production function 135, having access to the patterns detected by the pattern detection function 134, may choose to show the final slide in full-screen mode in the output video stream 230 for a couple of seconds, since it determines this slide to be potentially important in the state machine. It may also choose not to show the intermediately viewed slides at all in the output stream 230.

The detection of the pattern with several rapidly changing slides may be detected by a simple rule-based algorithm but may alternatively be detected using a trained neural network designed and trained to detect such patterns in moving images by classification.

In a different example, that may for instance be useful in case the video communication is a talk show, panel debate or similar, it may be desirable to quickly switch visual attention between, one the one hand, a current speaker, while, on the other hand, still giving the consumer 150 a relevant viewing experience by producing and publishing a calm and smooth output video stream 230. In this case, the event detection function 132 can continuously analyse each primary video stream 210, 301 to at all times determine whether or not a person being viewed in that particular primary video stream 210, 301 is currently speaking or not. This may, for instance, be performed as described above, using per se conventional image processing tools. Then, the pattern detection function 134 may be operable to detect particular overall patterns, involving several of the primary video streams 210, 301, the patterns being useful for producing a smooth output video stream 230. For instance, the pattern detection function 134 may detect a pattern of very frequent switches between a current speaker and/or patterns involving several concurrent speakers.

Then, the production function 135 can take such detected patterns into consideration when taking automated decisions in relation to the production state, for instance by not automatically switching visual focus to a speaker who only speaks for half a second before again going silent, or to switch to a state where several speakers are displayed side by side during a certain time period when both are speaking interchangeably or concurrently. This state decision process may in itself be performed using time series pattern recognition techniques, or using a trained neural network, but can also be based at least partly on a predetermined set of rules.

In some embodiments, there may be multiple patterns detected in parallel and forming input to the production function 135 state machine. Such multiple patterns may be used by different AI components, computer vision detecting algorithms, and so forth, by the production function 135. As an example, permanent slide changes can be detected while concurrently detecting unstable connections of some participant clients 121, while other patterns detect a current main speaking participant 122. Using all such available pattern data, a classifier neural network can be trained, and/or a set of rules can be developed, for analysis of a time series of such pattern data. Such a classification may be at least partly, such as completely, supervised to result in determined desired state changes to be used in the production. For instance, different such predetermined classifiers can be produced, specifically arranged to automatically produce the output video stream 230 according to various and different production styles and desires. Training may be based on known production state change sequences as desired outputs and known pattern time series data as training data. In some embodiments, a Bayesian model can be used to produce such classifiers. In a concrete example, information can be a priori gleaned from an experienced producer, providing input such as "in a talk show I never switch from speaker A to Speaker B directly but always first show an overview before I focus on the other speaker, unless that the other speaker is very dominant and speaking loud." This production logic then be represented as a Bayesian model on the general form "if X is true|given the fact that Y is true|perform Z." The actual detection (of whether someone is speaking loudly, etc.) could be performed using a classifier or threshold-based rules.

With large data sets (of pattern time series data), one can use deep learning methods to develop correct and appealing production formats for use in automated productions of video streams.

In summary, using a combination of the event detection based on individual primary video streams 210, 301; the deliberately introduced delay; the pattern detection based on several time-synchronised primary video streams 210, 301 and the detected events; and the production process based on the detected patterns, makes it possible to achieve automated production of the output digital video stream 230 according to a wide possible selection of tastes and styles. This result is valid across a wide range of possible neural network and/or rule-based analysis techniques used by the event detection function 132, pattern detection function 134 and production function 135. Furthermore, it is valid in the below-described embodiments featuring a first produced video stream being used in the automatic production of a second produced video stream; and use of different deliberately added delays for different groups of participant clients. In particular, it is also valid in the below-described embodiments wherein a detected trigger results in the switch of what video streams are used in the produced output video stream or results in an automatic crop or zoom of a used video stream in the output video stream.

As exemplified above, the production step may include producing the output digital video stream 230 based on a set of predetermined and/or dynamically variable parameters regarding visibility of individual ones of the primary digital video streams 210, 301 in the output digital video stream 230; visual and/or audial video content arrangement; used visual or audio effects; and/or modes of output of the output digital video stream 230. Such parameters may be automatically determined by the production function 135 state machine and/or be set by an operator controlling the production (making it semi-automatic) and/or be predetermined based on certain a priori configuration desires (such as a shortest time between output video stream 230 layout changes or state changes of the above-exemplified types).

In practical examples, the state machine may support a set of predetermined standard layouts that may be applied to the output video stream 230, such as a full-screen presenter view (showing a current speaking participant 122 in full-screen); a slide view (showing a currently shared presentation slide in full-screen); "butterfly view", showing both a currently speaking participant 122 together with a currently shared presentation slide, in a side-by-side view; a multi-speaker view, showing all or a selected subset of participants 122 side-by-side or in a matrix layout; and so forth. Various available production formats can be defined by a set of state machine state changing rules (as exemplified above) together with an available set of states (such as the set of standard layouts). For instance, one such production format may be "panel discussion," another "presentation," and so forth. By selecting a particular production format via a GUI or other interface to the central server 130, an operator of the system 100 may quickly select one of a set of predefined such production formats, and then allow the central server 130 to, completely automatically, produce the output video stream 230 according to the production format in question, based on available information as described above.

Furthermore, during the production a respective in-memory buffer is created and maintained, as described above, for each meeting participant client 121 or external video source 300. These buffers can easily be removed, added, and changed on the fly. The central server 130 can then be arranged to receive information, during the production of the output video stream 230, regarding added/ dropped-off participant clients 121 and participants 122 scheduled for delivering speeches; planned or unexpected pauses/resumes of presentations; desired changes to the currently used production format, and so forth. Such information may, for instance, be fed to the central server 130 via an operator GUI or interface, as described above.

As exemplified above, in some embodiments at least one of the primary digital video streams 210, 301 is provided to the digital video communication service 110, and the publishing step may then include providing the output digital video stream 230 to that same communication service 110. For instance, the output video stream 230 may be provided to a participant client 121 of the video communication service 110, or be provided, via API 112 as an external video stream to the video communication service 110. This way, the output video stream 230 may be made available to several or all of the participants to the video communication event currently being achieved by the video communication service 110.

As also discussed above, in addition or alternatively the output video stream 230 may be provided to one or several external consumers 150.

In general, the production step may be performed by the central server 130, providing the output digital video stream 230 to one or several concurrent consumers as a live video stream via the API 137.

Figure 8:
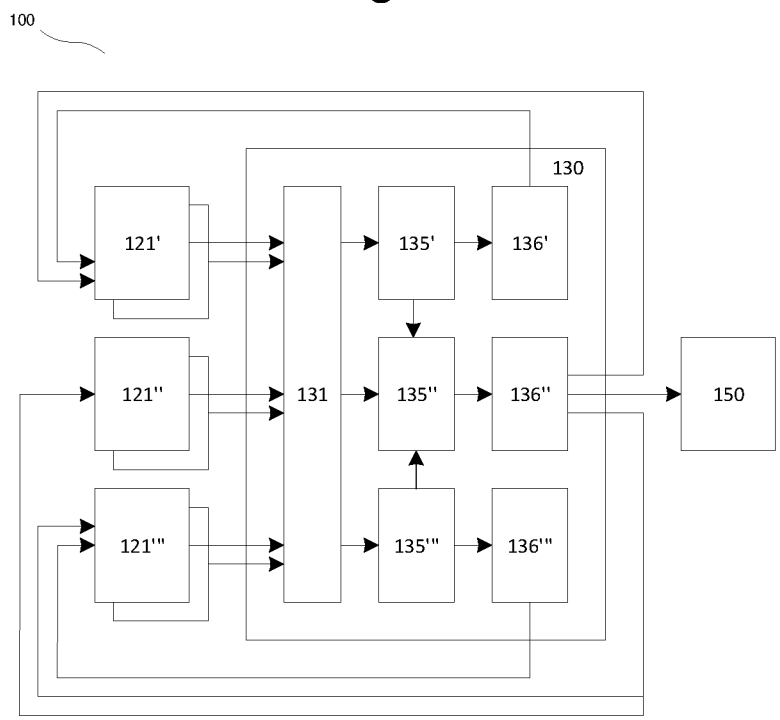
FIG. 8 illustrates a fourth exemplifying system.

As mentioned above, the participating clients 121 may be organised into two or more groups of participating clients 121. FIG. 8 is a simplified view of the system 100 in a configuration to perform automatic production of an output video stream in cases where there are such groups.

In this FIG. 8, the central server 130 includes the collecting function 131, that may be as described above.

The central server 130 also includes a first production function 135', a second production function 135" and a third production function 135". Each such production function 135', 135", 135'" corresponds to the production function 135, and what has been the above in relation to production function 135 applies equally to production functions 135', 135" and 135'". The production functions 135', 135", 135'" may be distinct or co-arranged in one single logical function with several functions, and there may also be more than three production functions, depending on the detailed configuration of the central server 130. The production functions 135', 135", 135'" may in some cases be different functional aspects of one and the same production function 135, as the case may be. The various communications between the production functions 135', 135", 135'" and other entities may take place via suitable APIs.

It is further realised that there may be a separate collecting function 131 for each of the production functions 135', 135", 135'" or groups of such production functions, and that there may be several logically separated central servers 130, each with a respective collecting function 131, depending on the detailed configuration.

Moreover, the central server 130 includes a first publishing function 136', a second publishing function 136" and a third publishing function 136'". Each such publishing function 136', 136", 136'" corresponds to the publishing function 136, and what has been the above in relation to publishing function 136 applies equally to publishing functions 136', 136" and 136'". The publishing functions 136', 136", 136'" may be distinct or co-arranged in one single logical function with several functions, and there may also be more than three publishing functions, depending on the detailed configuration of the central server 130. The publishing functions 136', 136", 136'" may in some cases be different functional aspects of one and the same publication function 136, as the case may be.

In FIG. 8, three sets or groups of participating clients are shown, for illustrative purposes, each corresponding to the above-described participating client 121. Hence, there is a first group of such participating clients 121'; a second group of such participating clients 121"; and a third group of such participating clients 121'". Each of these groups may include one or, preferably, at least two, participating clients. There may be only two such groups, or more than three such groups, depending on the detailed configuration. The allocation between groups 121', 121", 121'" may be exclusive in the sense that each participant client 121 is allocated to maximum one such group 121', 121", 121'". In alternative configurations, at least one participant client 121 may be allocated to more than one such group 121', 121", 121'" at the same time.

FIG. 8 also shows an external consumer 150, and it is realised that there may be more than one such external consumer 150 as described above.

FIG. 8 does not, for reasons of simplicity, show the video communication service 110, but it is realised that a video communication service of the above-discussed general type may be used with the central server 130, such as providing a shared video communication service to each participating client 121 using the central server 130 in the way discussed above.

Respective primary video streams may be collected, by collecting function 131, from the respective participating clients 121, such as participating clients of the groups 121', 121", 121'". Based on the provided primary video streams, production functions 135', 135", 135'" may produce respective digital video output streams.

As illustrated in FIG. 8, one or several such produced output streams may be provided as respective input digital video streams from one or several respective production functions 135', 135'" to another production function 135", that may in turn produce a secondary digital output video stream for publication by publication function 136", the secondary digital output video stream thus being produced based on one or several input primary digital video streams as well as on one or several pre-produced digital input digital video streams.

The two or more different production steps 135', 135", 135'" may include the introduction of a respective time-delay. In some embodiments, one or several of the respective produced output digital video streams from these production steps 135', 135", 135'" may be time-unsynchronised, due to the time-delay introduction, with any other of the video streams that may be provided to other participant clients in the publishing step. Such time-delays may be deliberately added and/or be a direct consequence of the production of the produced digital video stream in question, in any of the ways described herein. As a result, any participating client consuming the time-unsynchronised produced output digital video stream will do so in a "time zone" which is slightly offset (timewise) in relation to a video stream consumption "time zone" of the other participating clients.

For instance, one of the groups 121', 121", 121'" of participating clients 121 may consume a respective produced video stream in a first such "time zone", whereas participating client 121 of another one of the groups 121',

121", 121''' may consume a respective produced video stream in a second such "time zone". Since both these respective produced video streams may be produced based at least partly on the same primary video streams, all such participant clients 121 will be active in the same video communication, but in different "time zones" in relation to each other. In other words, a respective timeline for produced video stream consumption may be time-wise offset between different groups 121', 121", 121'''.

For instance, some production steps (such as 135', 135''') may be direct (without the use of any deliberately introduced time-delay) and/or involve only computationally relatively lightweight processing before provision for publication; whereas other production steps (such as 135") may involve a deliberately introduced time-delay and/or relatively heavyweight processing leading to the produced digital video stream in question being produced for earliest publication at a delay in relation to an earliest delay for publication of the respective digital video streams of the former production steps 135', 135'''.

Hence, each participating client 121 in one or several of the groups 121', 121", 121''' may be able to interact with each other at the same perceived time-delay. At the same time, groups being associated with a larger respective time-delay may use a produced video stream from a group with a smaller time-delay as an input video stream to be used when producing an output video stream that the larger time-delay group views in their later "time-zone."

The result of this first larger time-delay production (in step 135") is hence a produced digital video stream of the above-described type, which may for instance visually include one or several of the primary video streams in question, in processed or non-processed form, as sub-parts. This produced video stream in question may include live-captured video streams, slides, externally provided video or imagery, and so forth, as generally described above in relation to video output streams produced by the central server 130. The produced video stream in question may also be produced based on detected events and/or patterns of deliberately delayed or real-time input primary video streams, provided by participant clients 121, in the general way described above.

In an illustrative example, the first group 121' participant clients are part of a debate panel, communicating using the video communication service 110 at a relative low latency, each one of these participant clients continuously being fed produced video stream from publishing step 136' (or the respective primary video stream of each other). An audience to the debate panel is constituted by the second group 121" participant clients, continuously being fed the produced video stream from production step 135", in turn being associated with a slightly higher latency. The produced video stream from production step 135" may be automatically produced, in the general manner discussed above, to automatically shift between views of individual debate panel speakers (participant clients allocated to the first group 121', such views being provided directly from the collection function 131) and a produced view showing all debate panel speakers (this view being the first produced video stream). Hence, the audience can receive a well-produced experience while the panel speakers may interact with each other at minimum latency.

The delay deliberately added to the respective primary video streams used in the production step 136" may be at least 0.1 s, such as at least 0.2 s, such as least 0.5 s; and may be at the most 5 s, such as at the most 2 s, such as at the most 1 s. It may also depend on an inherit latency associated with each respective primary video stream, so as to achieve a full time-synchronisation between each of the used primary video streams and also the produced video stream incoming to production step 135" from production step 135'.

It is understood that the primary video streams in question, as well as the produced video stream from production step 135', may all be additionally deliberately delayed so as to improve pattern detection for use in the second production function 135" in the general way described above.

FIG. 8 furthermore illustrates a number of alternative or concurrent ways of publishing the various produced video streams produced by the central server 130.

Generally, in a publishing step, performed by a first publishing function 136' arranged to receive first produced video stream from the first production function 135', the first produced video stream may be continuously provided to at least one of a first participating client 121 and a second participating client 121. For instance, this first participating client may be a participating client from the group 121' providing a respective primary digital video stream to the first production function 135'.

In some embodiments, one or several of the participating clients of the group 121' may also receive a second produced video stream, by the second publishing function 136", in turn being arranged to receive a second produced video stream from the second production function 135".

Hence, each of the primary video stream-providing participating clients being allocated to the first group 121', if not provided directly with the primary digital video streams of each other, may be provided with the first produced video stream, involving a certain delay or latency due to the synchronisation between the primary video streams and also a possibly deliberately added delay or latency added in order to allow sufficient time for an event and/or pattern detection, as described above.

Correspondingly, each of the participating clients being allocated to the second group 121" may be provided with the second produced video stream, also including the deliberately added delay in connection to the second production step, added with the purpose of time-synchronising the first produced video stream with the first and second primary video streams. This extra delay may or may not cause communication difficulties between the participating clients of the second group 121", for instance since they interact in a different manner than the first group 121' participants with the video communication service 110.

Hence, first group 121' participant clients form a sub-group of all participating clients 121 currently participating in the video communication service 110 in question, being present in and using the service in question in a "time zone" that is slightly ahead (such as 1-3 seconds ahead) of any participating client instead being continuously provided a produced video stream, such as the first or the second produced video stream. Still, other participating clients (not allocated to the first group 121' but instead to the second group 121") will be continuously provided the second produced video stream, which is produced based on (and may at each point in time contain either or both of) at least one of the primary video streams which the second produced video stream is produced based on, but then in a slightly later "time zone". Since the first produced video stream is produced directly based on these at least one primary video streams, without any delay or latency added to time-synchronise them to an already-produced video stream based on the primary video streams themselves, a more direct, low-latency video communication service 110 experience is then made available to these participating clients 121.

Again, this may also mean that the participating clients 121 allocated to the first group 121' are not provided access to the second produced video stream.

As is illustrated in FIG. 8, the second produced video stream may also be produced as a digital video stream based additionally on a produced output video (a third produced output digital video stream) of a third production step 135". Each of the production steps 135', 135", 135''' may hence be produced based on at least partly overlapping primary input digital video streams, but using different respective deliberately added latencies ("time zones") in relation to the primary video streams and provided to different respective groups 121', 121", 121''' of participant clients 121.

The participant clients 121 allocated to the third group 121" may have less strict latency requirements than the participant clients 121 allocated to the first group 121'. For instance, the first group 121' participating clients 121 may be the members of the above-discussed debate panel (interacting with each other in real-time hence requiring low latency), whereas the third group 121" participating clients 121 may constitute a panel of experts or similar, that interact with the panel but in a more structured way (such as using clear questions/answers), thus being able to tolerate higher latency than the first group 121'.

Both the first produced video stream and the third produced video stream may be fed to the second production function 135" to base the production of the second produced video stream on, as the case may be.

Hence, the first production step 135' may involve introducing a deliberate delay or latency of the type discussed above, introduced in addition to any delay introduced as a part of the synchronisation of the first and second primary video streams, and introduced so as to achieve sufficient time, for instance, to perform an efficient event and/or pattern detection. Such introduction of a deliberate delay or latency may take place as a part of a synchronising performed by the synchronising function 133 (not shown in FIG. 8 for reasons of simplicity). The corresponding may be true for the third production step 135''', but introducing a deliberate delay or latency that is different from the deliberately introduced delay or latency for the first production step 135'.

In particular, the deliberately introduced delays or latencies result in a time-unsynchronisation between the first produced video stream and the third produced video stream. This means that the first and third produced video streams do not follow a common timeline in case they are both immediately and continuously published upon production of each individual frame.

Hence, three separate produced video streams may be produced and consumed/published simultaneously, but in different "time zones." Even though they are based on at least partly the same primary video material, the produced video streams are published with different latency. The first group 121', requiring the lowest latency, can interact using the first produced video stream, offering very low latency; the third group 121''', willing to accept slightly larger latency, can interact using the second produced video stream, offering more latency but on the other hand greater flexibility in terms of deliberately added delays so as to achieve a better automatic production as described elsewhere herein; whereas the second group 121", that are not so sensitive to latency, can enjoy interaction using the second produced video stream that can both incorporate material from the first 121' and third 121''' groups and also be automatically produced in a very flexible manner. It is especially noted that all these groups 121', 121", 121''' of participant users interact with each other using the video communication service 110, despite using the varying latencies and hence acting in different "time zones". However, due to the synchronisation of the individual input video streams in each production function, the participant users 121 will not notice the differing latency from their respective perspective.

As discussed above, respective participating clients 121 allocated to each of the groups 121', 121", 121''' may participate in one and the same video communication service 110 within which the second produced video stream is continuously published.

Then, different ones of the groups 121', 121", 121''' may be associated with different participator interaction rights in the video communication service 110. In these and other embodiments, different ones of the groups 121', 121", 121''' may also be associated with different maximum time-delays (latencies) used for producing a respective produced video stream published to participant clients 121 allocated to the group 121', 121", 121'''' in question.

For instance, the first group 121' of panel debating participant clients may be associated with full interaction rights and can speak whenever they wish to. The third group 121''' of participant clients may be associated with slightly restricted interaction rights, for instance that they need to request the floor before being able to speak by the video communication service 110 unmuting their mics. The second group 121" of audience participant users may be associated with even more restricted interaction rights, such as only being able to pose questions in writing in a common chat room but not being able to speak.

Hence, various groups of participant users may be associated with different interaction rights and different latencies for the respective produced video stream that is published to them, in a way so that latency is an increasing function of decreasing interaction rights. The freer the participant user 121 in question is allowed, by the video communication service 110, to interact with other users, the lower the accepted latency. The lower the accepted latency, the smaller the possibilities for the corresponding automatic production function to take into considerations things such as detected events or patterns.

A group having a largest latency may be a viewer-only group, with no interaction rights apart from passive participation in the video communication service.

In particular, a respective maximum time-delay (latency) for each of the groups 121', 121", 121''' may be determined as a largest latency difference across all primary video streams and any produced video streams that are continuously published to participating clients in the group in question. To this sum may be added any additional time-delay added deliberately with the purpose of detecting events and/or patterns as described above.

As used herein, the term "production" and "produced digital video stream" may refer to different types of production. In one example, a single, well-defined digital video stream is produced by a central entity, such as the central server 130, to form the produced digital video stream in question, for provision to and publication at each of a particular set of participating clients 121 that are to consume the produced digital video stream in question. In other cases, different individual such participating clients 121 may view a slightly different version of the produced digital video stream in question. For instance, the produced digital video stream may include several individual or combined digital video streams that the participating client 121 local software function 125 can allow the user 122 in question to switch between; arrange on the screen 124; or to configure or process in any other way. Many times, what is important is in what "time zone" (i.e. at what latency) that the produced digital video stream, including any time-synchronised sub-components, are provided. Hence, the case where different participant clients 120 of the first group 121' are provided each other's primary video streams, described above in connection to FIG. 8, may be viewed as a first produced digital video stream being provided to these participant clients (in the sense that the time-synchronised set of raw or processed first and second primary digital video streams are made available to both the first and second participant clients).

To further clarify and exemplify the use of participant clients groups 121', 121", 121''' described above, the following example is provided, in the form of a video communication service meeting involving three different concurrent "time zones":

A first group of participant clients 121' are experiencing interaction with each other in real-time, or at least near real-time (depending on unavoidable hardware and software latencies). These participant clients are provided video, including sound, from each other to achieve such interaction and communication between the users 122 in question. The first group 121' may serve users 122 at the core of the meeting, the interaction of which may be of interest for other (non-first group 121') participant clients to take part of.

A second group of such other participant clients 121" participate in the same meeting, but in a different "time zone", being further from real-time than the first group participant clients 121'. For instance, the second group 121" may be an audience with interaction privileges such as the possibility to pose questions to the first group 121'. The "time zone" of the second group 121" may have a delay in relation to the "time zone" of the first group 121' such that posed questions and answers are associated with a noticeable but short delay. On the other hand, this slightly larger delay allows this second group 121" participant clients to experience a produced digital video stream that was automatically produced in a more complex manner, providing a more agreeable user experience.

A third group of such other participant clients 121" also participate in the same meeting, but as viewers only. This third group 121" consume a produced digital video stream that can be automatically produced in an even more elaborate and complex manner, being consumed in a third "time zone" having even more delay than the second "time zone". However, since the third group 121''' cannot provide input to the communication service in a way affecting the first 121' and second 121" groups, the third group 121''' will experience the meeting as being performed in "real-time", with an agreeable production.

There may, of course, be more than three such groups of participant clients, being associated with respective meeting "time zones" of increasingly larger time delay and increasing production complexity, using the principles described herein.

Figure 9:
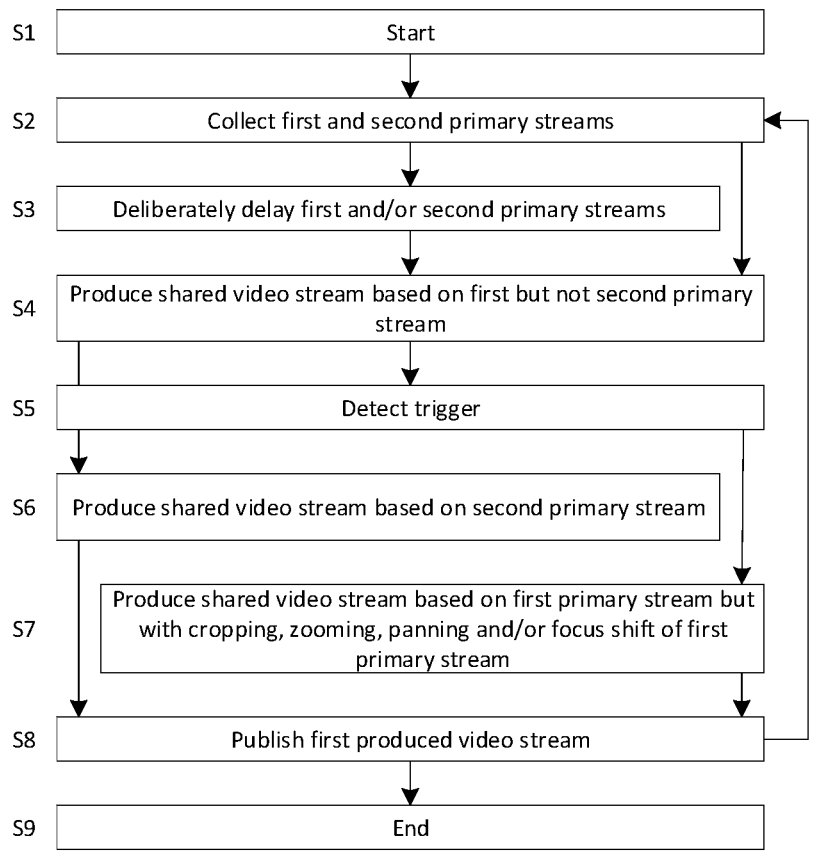
FIG. 9 illustrates a second method.

FIG. 9 illustrates a method according to one embodiment of the present invention, the method being for providing a shared digital video stream.

In a first step S1, the method starts.

In a subsequent collecting step S2, a first digital video stream is collected from a first digital video source, and a second digital stream is collected from a second digital video source, in the way generally described above. Hence, the first and/or second digital video stream may each be collected from a respective participating client 121 or from an external source 300 and may be performed by the collecting function 131 of the central server 130.

In a subsequent first production step S4, the shared digital video stream is produced as an output digital video stream. This production may be performed as generally described above, such as by production step 135, 135', 135", 135'''.

In the first production step S4, the shared digital video stream is produced based on consecutively considered frames of the first digital video stream so that image information from the first digital video source is visible in the shared digital video stream, but so that image information from the second digital video source is not visible in the shared digital video stream. In other words, the shared video stream will to at least some extent contain visual material originating from the first digital video stream but will not contain any visual material originating from the second digital video stream.

In a subsequent trigger detection step S5, the first and/or second digital video stream is digitally analysed so as to detect at least one trigger.

This analysis and detection may be performed by the same production step 135, 135', 135", 135''' that produces the shared video stream in question and is based on the automatic detection of an image and/or audio pattern of a predetermined type.

The trigger may be an event or pattern of the types described and exemplified above (performed by the event detection function 132 and pattern detection function 134, respectively), and the detection thereof will typically take place using automatic digital processing of audio and/or image/video data contained in the digital video stream(s) in question. For instance, and as exemplified above, automatic image processing algorithms, such as using a trained neural network or other machine learning tools, may be employed to automatically detect the presence of a certain trigger based on imagery contained in the first and/or second video feed. Correspondingly, per se conventional automatic audio processing algorithm of corresponding type may be used to detect the presence of a certain trigger based on audio contained in the first and/or second video feed.

That the image and/or audio pattern is of a "predetermined type" means that the pattern in question can be characterised in terms of a set of one or several absolute or relative parameter values that are defined ahead of the detection in question. This will be exemplified below.

In general, the existence of the audio or image pattern constitutes the corresponding trigger in question. Moreover, the trigger is predetermined specifically for being instructive, to the automatic production step 135, 135', 135", 135" producing the shared video stream, according to a predetermined production rule, to alter the production mode (rule) of the shared digital video stream upon the detection of the trigger in question.

Hence, the production step 135, 135', 135", 135" may include or have access to a database defining one or several triggers in terms of corresponding parameter values characterising a corresponding image and/or audio pattern, instantaneous or over time.

In a subsequent second production step S6 or S7, initiated in response to the detection of the trigger, the shared digital video stream is then again produced, by the same (or different) production step 135, 135', 135", 135''', but not in the same way as in the first production step S4.

In a first alternative second production step S6, the shared digital video stream is produced as an output digital video stream based on consecutively considered frames of the second digital video stream, so that image information from the second digital video source is visible in the shared digital video stream. It is noted that the output digital video stream may in this case furthermore be produced based on, or be produced not based on, consecutively considered frames of the first digital video stream, so that image information from the first digital video source is visible in the shared digital video stream. In other words, when switching from the first production step S4 to the second production step S6, the shared video stream may go from displaying content from the first but not the second video stream, to either displaying content from the second but not the first video stream, or to display content from both the first and the second video streams.

In a second alternative second production step S7, the shared digital video stream is produced as an output digital video stream based on consecutively considered frames of the first digital video source but with at least one of a different cropping, a different zooming, a different panning and a the selection of a different focus plane of the first digital video stream as compared to the first production step S4. In other words, the contents of the video stream being displayed in the shared video stream are cropped, de-cropped, zoomed-in, zoomed-out, vertically and/or horizontally panned, and/or a focus plane of the video stream in question is shifted, in relation to a current crop/zoom/pan/focus plane status of the video stream as used in the first production step S4.

It is realised that such crop/pan/zoom/focus plane may be performed by the production step 135, 135', 135", 135'" in question based on an existing video stream (that may then itself contain multiple possible focus planes with different image information on pixel level), and/or by the production step 135, 135', 135", 135" communicating a command to a video source (such as a digital video camera) capturing the video stream in question) to modify the corresponding capture parameter accordingly. For instance, this may then entail a corresponding camera capturing the video stream in question zooming, panning and/or shifting its focus plane in accordance with the instructions provided by the production step 135, 135', 135", 135'".

In a subsequent publishing step S8, the output digital video stream is continuously provided to a consumer of the shared digital video stream, such as to a participating client 121 and/or to an external consumer 150, in the general way described above.

The method may then iterate back to step S2, as illustrated in FIG. 9.

In a subsequent step S9, the method ends.

The first digital video stream may be continuously captured by a first digital camera, and the second digital video stream may be continuously captured by a second, different digital camera (hence constituting primary video streams using the terminology used previously herein). Alternatively, such in the case using several different groups 121', 121", 121'" of participating clients 121 being associated with different respective latencies ("time zones") described above, the first and/or second digital video stream may constitute a respective previously produced digital video stream, in turn being produced with different latency ("time zone") as compared to the presently produced shared video stream (see above for details regarding such "time zones").

In case the first video stream is an already-produced video stream, it is preferred (albeit not necessary) that any cropping/zooming/panning is performed based on the already-existing first video stream, as opposed to instructing any upstream camera to modify its crop/zoom/pan settings.

Using the present method, an automatic production may be achieved of the shared video stream that can offer a more intuitive and natural experience to consumers of the produced shared video, since the actual audio/video contents of the respective video streams are used to detect triggers that in turn result in the automatic production moving from one automatic production format to a different such format.

Triggers may be predefined, using suitable parameters, to cater for various needs. For instance, behaviour of individual persons being depicted in the first and/or second video stream may be automatically assessed with respect to such triggers and allowed to change the production format depending on how such behaviour is conducted. In other examples, particular predefined triggers may be used as manual cues, delivered by a human being depicted in the first and/or second video stream, to change the production format in question on the fly, during an ongoing production.

In the following, a number of examples of such triggers and corresponding production format changes will be described.

Figure 10A:
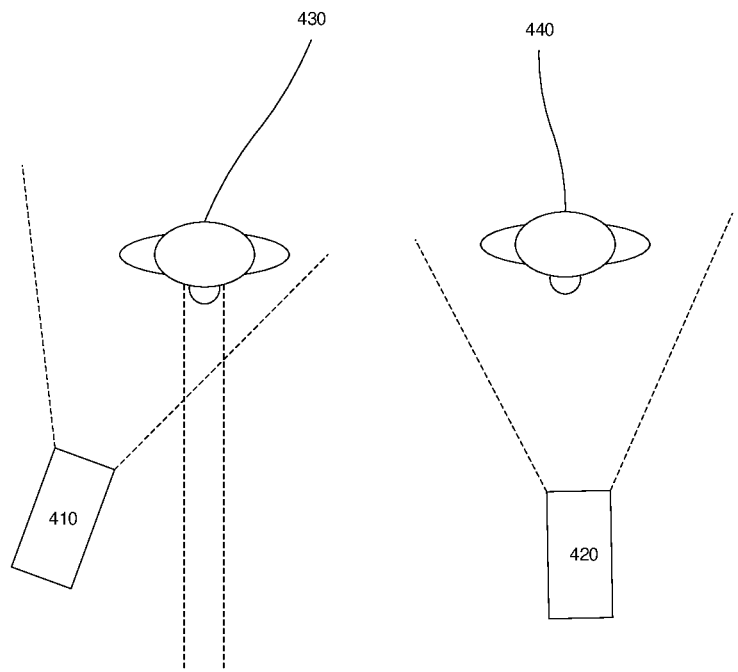
FIGS. 10a-11b illustrate, from above and in various configurations, cameras, and participants.
Figure 10B:
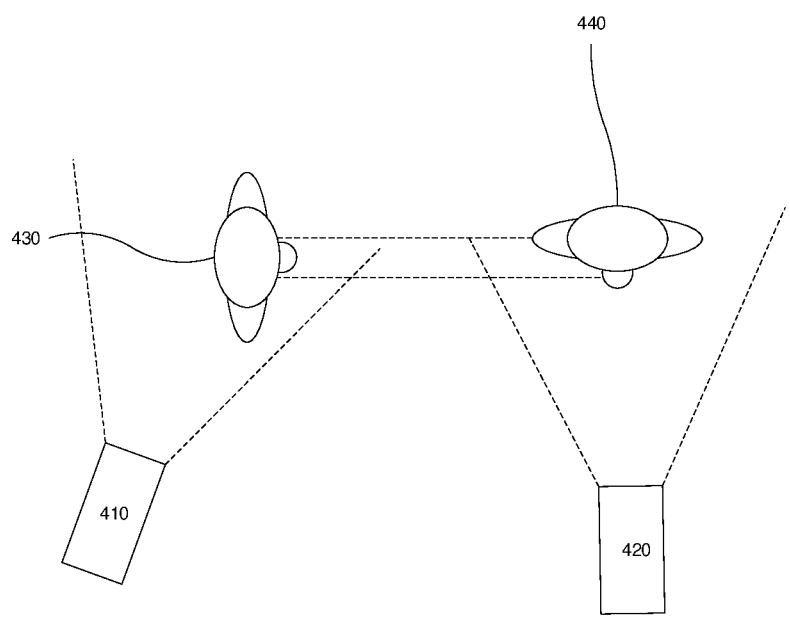

In a first example illustrated in FIGS. 10a and 10b, the predetermined pattern includes a first (human or, for instance mechanical machine) participant 430 depicted in the first digital video stream, in FIG. 10a illustrated as captured by a first digital video camera 410. The first participant 430 gazes towards an object 440, in the example illustrated in FIG. 10a a second (human or machine) participant, the second participant 440 in turn being depicted in the second digital video stream. The second digital video stream is, in this example, captured by a second digital video camera 420.

It is realised that the second object 440 may be something else, such as a group of human participants or any physical object of general interest for the ongoing communication. For instance, the shared video stream may be a documentation of a medical procedure, whereby the object 440 may be a part of a patient. In other examples, the object 440 may be the object of a teaching session or sales presentation. The object 440 may also be, for instance, a whiteboard or slide presentation screen.

The first and second video streams may be of any of the types described hereinabove.

In the case illustrated in FIGS. 10a and 10b, the predetermined image and/or audio pattern is detected based on information about a relative orientation of the first camera 410, the participant 430 and the object 440. This information may be present in the system 100 (and in particular in the central server 130), such as previously provided during setup/configuration and/or automatically detected during ongoing production.

For instance, respective locations of the first 410 and second cameras 420 may be fed to the central server 130 from the respective camera 410, 420 in question, by the cameras including measurement means, such as a MEMS circuit including an accelerometer and a gyro, or other per se conventional localisation means, such as stepping motors, arranged to continuously or intermittently measure a current location of the camera 410, 420 in question based on some suitable geometric reference. In other examples, the orientation of the cameras 410, 420 in question may be detected by a third camera (not shown), using a suitable automatic digital image processing algorithm, the third camera capturing at least one of the cameras 410, 420 in an image and determining, using digital image processing, the relative orientations in question based on this captured image information.

It is noted that, in this context, an "orientation" may encompass both a location and an orientation component.

The location of the first participant 430 and the object 440, in relation to some suitable reference system (such as in relation to the first camera 410 and/or the second camera 420) may be determined using digital image processing based on the video stream(s) captured by the first camera 410 and/or the second camera 420.

As illustrated in FIG. 10a, the first participant 430 gazes downwards in the Figure, not towards the second participant 430.

In this example, though, the predetermined image and/or audio pattern is further detected based on a digital image-based determination of at least one of a body direction, a head direction, and a gaze direction of the first participant 430, based on the first digital video stream.

As is illustrated in FIG. 10b, the first participant 430 has turned towards the second participant 440, facing (and gazing) towards the second participant 440.

Body and head direction of the first participant 430 may be determined based on digital image processing of the first video stream, captured by the first camera 410. Such algorithms are convention as such, and can, for instance, use a priori knowledge about an expected shape of the first participant 430 in the video stream captured by the first camera 410 when turned in various directions. This may be accomplished using a trained neural network or other machine learning components. Together with the relative orientation of the first camera 410, the relative location of the first participant 430 and the object 440, and the determined body or head direction of the first participant 430, the central server 130 can determine if the first participant 430 is turned (head or body) towards the object 440 in question or not.

Gaze direction of the first participant 430 may be accomplished in a similar manner, such as based on the images captured by the first video camera 410. Such gaze tracking technology is well-known in itself and may for instance be based on discerning the position of pupils and light reflections visible in the eyes of the first participant 430.

The trigger in question may be defined as the detection of a transition pattern, such as the transition by the first participant 430 from not being directed or gazing towards the object 440 to the first participant 430 in fact facing and/or gazing towards the object 440. Hence, the central server 130 may continuously monitor for such transition, based on suitably set corresponding absolute or relative parameter values, and the trigger may be detected once such a transition occurs.

It is realized that, in this and other embodiments, several different predetermined images and/or audio patterns may be monitored for at the same time, and any such detected predetermined image and/or audio pattern will then constitute a detected corresponding trigger, in turn leading to the automatic production switching to a different respective corresponding mode, according to a predetermined parameterised production logic.

Figure 10C:
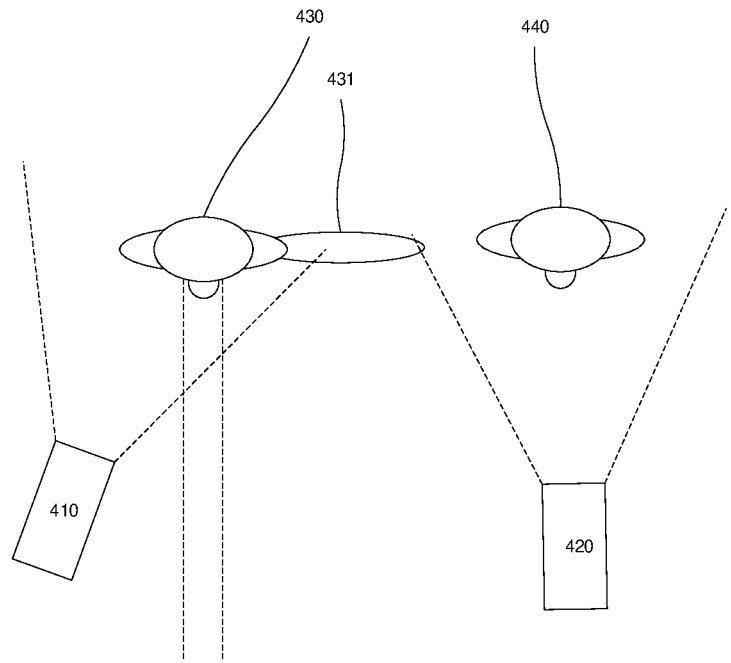

FIG. 10c illustrates a second example, being similar to the one shown in FIG. 10b, but wherein the predetermined image and/or audio pattern corresponding to the trigger in question is not that the first participant 430 turns or gazes to the object 440. Instead, the predetermined image and/or audio pattern includes a participant (such as the first participant 430) depicted in the first digital video stream (such as by the first camera 410) making a predetermined gesture.

The gesture may be any gesture of predetermined, parameterised type, such as a gesture in geometric relation to the object 440 depicted in the second digital video stream. Concretely, the gesture may be the first participant 430 pointing towards the object 440 (as depicted in FIG. 10c showing an arm 431 of the first participant 430 pointing towards the object 440). The gesture may, however, also be based on, for instance, only a hand or finger of the first participant 430.

This gesture-type predetermined pattern (and in particular its direction in space, if any) may be detected in a way corresponding to the situation described in connection to FIG. 10b, hence based on information about a relative orientation of the first camera 410, the first 430 participant and the object 440, and further being detected based on a digital image-based determination of a gesture direction of the first participant 430 based on the first digital video stream.

For both the case illustrated in FIG. 10b and the case illustrated in FIG. 10c, the orientation of the second camera 420 may also be detected and used in the determination of if the trigger is detected or not. For instance, it can be used to determine that the object 440 is visible in the second camera 420, which may constitute a condition for the trigger to be detected in case the trigger is associated with a switching to the second camera 420 upon the detected trigger in question. In some embodiments, the second production step S6 may include determining one second camera 420 (among several possible second cameras) currently showing the object 440 and selecting that second camera 420 as the one providing the second video stream in question in the second production step S6.

In the example shown in FIG. 10d, there is only one camera, namely the first camera 410 (even though it is understood that more cameras and other video stream generating components may of course be present in various embodiments). The first camera 410 captures both the first participant 430 and the object 440. As the first participant 430 turns her body, head, or gaze towards the object 440, this detected image pattern constitutes the detected trigger. In this case, the second production step may include the video stream captured by the first camera 410 being panned and/or zoomed and/or cropped in the produced output video stream, so as to focus the attention of a viewer of the produced output video stream in question to the object 440.

In practical examples, the detected attention of the first participant 430 (embodied in the body, head or gaze direction of the first participant 430 as exemplified above) causes the automatic production (in the second production step) to highlight or shift focus in some manner, based on the existing video streams or by instructing units producing the primary video streams in question, so as to provide increased visual focus to the object 440 in question.

Figure 11A:
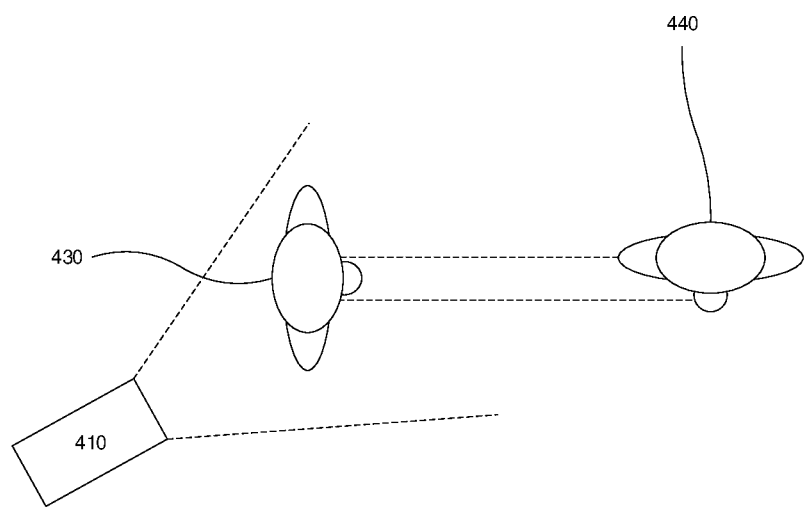
Figure 11B:
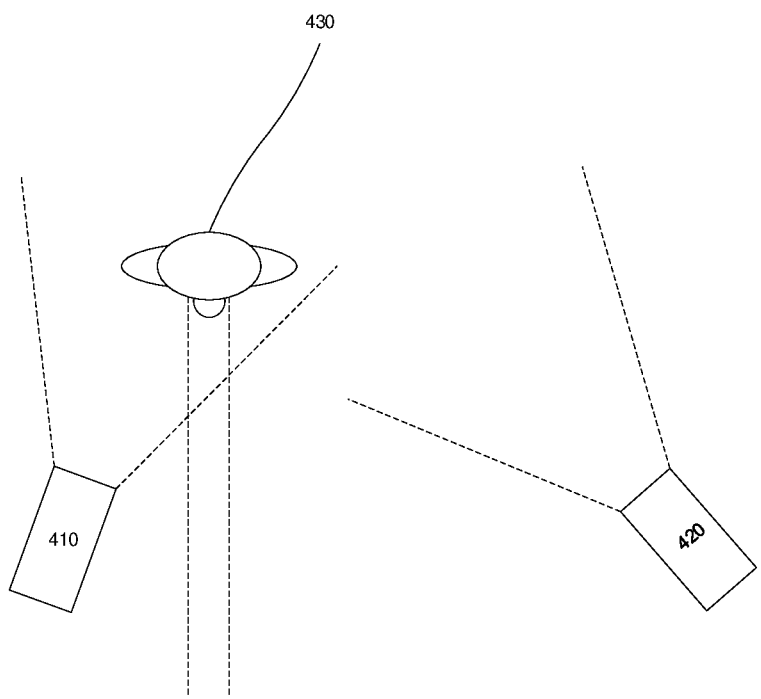

In another example, illustrated in FIGS. 11a and 11b, the predetermined image and/or audio pattern includes the first participant 430 depicted in the second digital video stream gazing towards the second camera 420 continuously capturing the second digital video stream. Specifically, in FIG. 11a the first participant 430 does not gaze into the second camera 420, whereas the first participant 430 in FIG. 11a gazes towards the second camera 420. This detected switch of the gaze direction may hence constitute the detection of the corresponding trigger in question.

In other examples, the predetermined image and/or audio pattern includes a relative change of movement in the first digital video stream and/or the second digital video stream. For instance, the amount of general movement shown in the first video stream may be parameterised and a zoom of the first video stream and/or the second video stream may then be increased as a function of decreasing general movement or vice versa; or the second production step may switch to the second image stream in case of a detected increased general movement, the second video stream being captured by the second camera 420 showing a more wide-angle or more distant view of a scene depicted by the first camera 410. Correspondingly, a recorded sound of the participant's 430 speech may be used to determine such a zoom-in/zoom-out/camera switch performance. For instance, if it is recorded that the participant 430 talks louder, there may be a zoom-out of the first video stream in the output shared video stream and vice versa.

In yet other examples, the predetermined image and/or audio pattern includes a predetermined sound pattern in turn being characterised by its frequency and/or amplitude and/or amplitude time derivative and/or absolute amplitude change and/or a sound location as determined for instance by a relative microphone volume of a particular sound-capturing microphone. Such a microphone may be a part of, for instance, the first camera 410, or may be a standalone microphone. Such microphone is then arranged to record sound arising at or in direct connection to a scene being shown in the first video stream.

For instance, the predetermined sound pattern may include a predetermined phrase containing at least one verbally uttered word. The sound may be recorded and be provided as a part of the video streams fed to the first production step, and the predetermined pattern may be detected by the central server 130 and then, when the corresponding trigger is detected, the production may switch to the second production step. The audio analysis may use a suitable digital audio processing algorithm, such as a rule-based decision engine using various sound information (such as pitch, amplitude, and pattern matching) to determine if the predetermined sound patter is detected or not; a trained neural network; and so forth.

As described in detail above, the present method may also include a delaying step (see FIG. 9), wherein a latency is deliberately introduced with respect to at least the first and the second digital video stream, the latency being present in the shared digital video stream. Then, the trigger detection step may be performed based on the first and/or second digital video streams before introducing the latency.

The latency may be at the most 30 seconds, such as at the most 5 seconds, such as at the most 1 seconds, such as at the most 0.5 seconds.

Using such deliberately added delay, the automatic production may for instance plan an automatic switch from a first camera 410 to a second camera 420 based on a detected trigger (such as the participant 430 looking into the second camera 420), the planning taking place a certain time (such as 0.5 s) before the event is to take part in the produced shared video stream. This way, such a switch can be performed at precisely the time of the trigger actually taking place, or at a time fitting optimally with other parameterised production parameters, such as being timed with a speech rhythm of the participant 430 in question.

In case there are several groups 121', 121", 121''' of the above-discussed types, such planning may take place with different time horizons with respect to produced output video streams produced with respect to (for consumption by) respective participant clients 121 of different ones of such groups 121', 121", 121'''.

The predetermined image and/or audio pattern may constitute (and be determined as) an "event" and/or a "pattern" of the type described above in connection to the event detection function 132 and the pattern detection function 132.

The following are a number of examples of how the present invention can be embodied in practise:

In a multi-cam presentation, talk-show or panel discussion, different cameras can present different camera angles of a presenter. The automatic production function can then be configured to automatically choose between the different camera angles depending on which one of the cameras the presenter is looking at, and/or triggered by gestures or audio cues.

In a video podcast or talking-head video, the automatic production function can be configured to automatically switch between different cameras depending on what camera a current speaker is facing.

In a townhall meeting, the automatic production function can be configured to switch to a camera pointed at an audience for adding input or questions from attendees. This could be triggered by monitoring an audio feed associated with that camera and when it reaches a certain level that camera goes live or by a voice command, for example "question from the audience".

In a product presentation or review, the automatic production function can be configured to automatically switch to a camera pointed at a product when it senses motion in that source or based on another trigger.

In robotic surgery, a video stream captured by a robotic camera capturing the surgery may be replaced by a normal information presentation upon detecting predetermined gestures, audio cues, or upon recognizing that the surgeon is not using a surgeon console or looking up from it.

In an educational context, a camera could be configured to be pointed at a regular whiteboard or chalkboard, and the automatic production function can be configured to switch to that camera when the teacher is making gestures toward the board or by voice commands.

In a concert or other cultural event, the automatic production function may be configured to switch between cameras pointed at a singer, bandmembers or an orchestra. This can be done by either gestures or triggered by which camera the talent is looking at.

In a theatrical performance, the automatic production function may be configured to cut between different camera angles depending on who is talking, either by face-tracking, audio cues, gestures or by following a predetermined schedule (rundown).

Hence, in addition to trigger detections of the types described hereinabove, the automatic production may also switch from one format (production rule) to another one based on predetermined schedules (rundowns), and of course also manual override, as the case may be.

The present invention also relates to a computer software function for providing the shared digital video stream according to what has been described above. Such a computer software function may then be arranged to, when executing, perform at least some of the above-described collecting, delay, first production, trigger detect, second production and publishing steps described above. The computer software function may be arranged to execute on physical or virtual hardware of the central server 130, as described above.

The present invention also relates to the system 100 as such, being a system for providing the shared digital video stream, and in turn including the central server 130. The central server 130, in turn, may be arranged to perform at least some of the collecting, delay, first production, trigger detect, second production and publishing steps described above. For instance, these steps may be performed by the central server 130 executing the computer software function to perform the steps as described above. The collection may be performed by the collecting function 131. The detection of the predetermined image and/or audio pattern and triggers described above may be performed by the event- and pattern detection function 132, 134, or by the production function 135, of the central server 130. Any deliberate delay may be performed in the way generally described above, such as by the collecting function 131. The publishing may be performed by the publishing function 136.

It is understood that the principles of automatic production based on an available set of input video streams described above, such as involving time-synchronisation of such input video streams, event and/or pattern detection, as well as trigger detection, and so forth, may be applied at different levels concurrently. Hence, one such automatically produced video stream may form an available input video stream to a downstream automatic production function in turn producing a video stream, and so on.

The central server 130 may be arranged to control group 121', 121", 121''' allocation to individual participant clients 121. For instance, changing group allocation for a particular such participant client dynamically during the course of the live video communication service session may be a part of the automatic production of the video communication service by the central server 130. Such reallocation may be triggered based on a predetermined timetable or dynamically, for instance as a function of parameter data that may change dynamically over time, for instance upon the request (provided via the client 121 in question) of individual participant client users 122.

Correspondingly, the central server 130 may be arranged to dynamically change the group structure during the course of the video communication service, such as only using a certain group for a predetermined time slot (such as during a planned panel debate).

Changing group allocation in a predetermined manner may be the automatic result of the detection of a particular trigger, in a way corresponding to what has been described above in connection to FIGS. 9-11*b*.

In all of the above-described aspects, the present invention may further include an interaction step, in which at least one participant client of a first group, the first group being associated with a first latency, interacts in a two-way (bi-directional) manner with at least one participant client of the same first group or of a second group, the second group then being associated with a second latency, the second latency being different from the first latency. It is understood that these participating clients may all be participants to one and the same communication service of the above-described type.

Above, preferred embodiments have been described. However, it is apparent to the skilled person that many modifications can be made to the disclosed embodiments without departing from the basic idea of the invention.

For instance, many additional functions can be provided as a part of the system 100 described herein, and that are not described herein. In general, the presently described solutions provide a framework on top of which detailed functionality and features can be built, to cater for a wide variety of different concrete application wherein streams of video data is used for communication.

In general, all which has been the in relation to the present method is applicable to the present system and computer software product, and vice versa as applicable.

Hence, the invention is not limited to the described embodiments, but can be varied within the scope of the enclosed claims.

The invention claimed is:

1. A method for providing a shared digital video stream, the method comprising:
    in a collecting step, collecting from a first digital video source a first digital video stream and from a second digital video source a second digital video stream;
    in a first production step, producing the shared digital video stream as an output digital video stream based on consecutively considered frames of the first digital video stream so that image information from the first digital video source is visible in the shared digital video stream, but so that image information from the second digital video source is not visible in the shared digital video stream;
    in a trigger detection step, automatically detecting a trigger by performing at least one of:
    a) digitally analyzing the first digital video stream to automatically detect the trigger in the form of a participant depicted in the first digital video stream gazing towards, or making a predetermined gesture in relation to, an object depicted in the second digital video stream, the detection being based on information about a relative orientation of the first camera, the participant and the object, the detection further being based on a digital image-based determination of at least one of a body direction, a head direction, a gaze direction and a gesture direction of the participant in question; and
    b) digitally analyzing the first and/or second digital video stream to automatically detect the trigger in the form of a transition of a gaze direction of the participant depicted in the second digital video stream from not gazing into the second camera to gazing into the second camera,
    the trigger being instructive, according to a predetermined production rule, to alter the production mode of the shared digital video stream;
    in a second production step, initiated in response to the detection of the trigger, producing the shared digital video stream as an output digital video stream based on consecutively considered frames of the second digital video stream so that image information from the second digital video source is visible in the shared digital video stream, and/or producing the shared digital video stream as an output digital video stream based on consecutively considered frames of the first digital video source but with at least one of a different cropping, a different zooming, a different panning or a different focus plane selection of the first digital video stream as compared to the first production step; and
    in a publishing step, continuously providing the output digital video stream to two or more consumers of the shared digital video stream.

2. The method of claim 1, wherein:
    the first digital video stream is continuously captured by a first digital camera; and
    the second digital video stream is continuously captured by a second digital camera.

3. The method of claim 1, wherein:
    the second object is a human, a group of humans, a machine, a whiteboard, or a presentation screen.

4. The method of claim 1, wherein:
    the gesture is a pointing towards the object.

5. The method of claim 1, wherein:
the detection of the trigger comprises detecting a predetermined image pattern in turn comprising a relative change of movement in the first and/or second digital video stream.

6. The method of claim 1, further comprising:
determining a location of the participant and the object, in relation to the first camera and/or the second camera, using digital image processing based on the first and/or second digital video stream.

7. The method of claim 1, wherein:
the second production step comprises determining a particular one second camera among several possible second cameras currently showing the object and selecting that second camera as the one providing the second video stream in question.

8. The method of claim 1, wherein:
the production in the second production step is configured to highlight or shift focus of the output digital video stream so as to provide increased visual focus to the object.

9. The method of claim 1, further comprising:
a delaying step, wherein a latency is deliberately introduced with respect to at least the first and the second digital video stream, the latency being present in the shared digital video stream, wherein:
the trigger detection step is performed based on the first and/or second digital video streams before introducing the latency.

10. The method of claim 9, wherein:
the latency is at most 30 seconds.

11. A computer program product for providing a shared digital video stream, the computer program product being stored on a non-transitory computer readable medium and comprising instructions that when executed by a processor cause the processor to perform:
a collecting step, wherein a first digital video stream is collected from a first digital video source and a second digital video stream is collected from a second digital video source;
a first production step, wherein the shared digital video stream is produced as an output digital video stream based on consecutively considered frames of the first digital video stream so that image information from the first digital video source is visible in the shared digital video stream, but so that image information from the second digital video source is not visible in the shared digital video stream;
a trigger detection step, wherein a trigger is automatically detected by at least one of:
a) digitally analyzing the first digital video stream to automatically detect the trigger in the form of a participant depicted in the first digital video stream gazing towards, or making a predetermined gesture in relation to, an object depicted in the second digital video stream, the detection being based on information about a relative orientation of the first camera, the participant and the object, the detection further being based on a digital image-based determination of at least one of a body direction, a head direction, a gaze direction and a gesture direction of the participant in question; and
b) digitally analyzing the first and/or second digital video stream to automatically detect the trigger in the form of a transition of a gaze direction of the participant depicted in the second digital video stream from not gazing into the second camera to gazing into the second camera,
the trigger being instructive, according to a predetermined production rule, to alter the production mode of the shared digital video stream;
a second production step, initiated in response to the detection of the trigger, wherein the shared digital video stream is produced as an output digital video stream based on consecutively considered frames of the second digital video stream so that image information from the second digital video source is visible in the shared digital video stream, and/or the shared digital video stream is produced as an output digital video stream based on consecutively considered frames of the first digital video source but with at least one of a different cropping, a different zooming, a different panning or a different focus plane selection of the first digital video stream as compared to the first production step; and
a publishing step, wherein the output digital video stream is continuously provided to two or more consumers of the shared digital video stream.

12. A system for providing a shared digital video stream, the system comprising a central server in turn comprising:
a collecting function, arranged to collect from a first digital video source a first digital video stream and from a second digital video source a second digital video stream;
a first production function, arranged to produce the shared digital video stream as an output digital video stream based on consecutively considered frames of the first digital video stream so that image information from the first digital video source is visible in the shared digital video stream, but so that image information from the second digital video source is not visible in the shared digital video stream;
a trigger detection function, arranged to automatically detect a trigger by performing at least one of:
a) digitally analyzing the first digital video stream to automatically detect the trigger in the form of a participant depicted in the first digital video stream gazing towards, or making a predetermined gesture in relation to, an object depicted in the second digital video stream, the detection being based on information about a relative orientation of the first camera, the participant and the object, the detection further being based on a digital image-based determination of at least one of a body direction, a head direction, a gaze direction and a gesture direction of the participant in question; and
b) digitally analyzing the first and/or second digital video stream to automatically detect the trigger in the form of a transition of a gaze direction of the participant depicted in the second digital video stream from not gazing into the second camera to gazing into the second camera,
the trigger being instructive, according to a predetermined production rule, to alter the production mode of the shared digital video stream;
a second production function, arranged to be initiated in response to the detection of the trigger, and to produce the shared digital video stream as an output digital video stream based on consecutively considered frames of the second digital video stream so that image information from the second digital video source is visible in the shared digital video stream, and/or to produce the shared digital video stream as an output digital video stream based on consecutively considered frames of the first digital video source but with at least one of a different cropping, a different zooming, a different panning or a different focus plane selection of the first digital video stream as compared to the first production function; and a publishing function, arranged to continuously provide the output digital video stream to two or more consumers of the shared digital video stream.

\* \* \* \* \*